United States Patent
Chiang et al.

(10) Patent No.: US 11,166,037 B2
(45) Date of Patent: Nov. 2, 2021

(54) MUTUAL EXCLUDING SETTINGS FOR MULTIPLE TOOLS

(71) Applicant: MediaTek Inc., Hsinchu (TW)

(72) Inventors: Man-Shu Chiang, Hsinchu (TW);
Chun-Chia Chen, Hsinchu (TW);
Chih-Wei Hsu, Hsinchu (TW);
Chia-Ming Tsai, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/802,448

(22) Filed: Feb. 26, 2020

(65) Prior Publication Data
US 2020/0275112 A1    Aug. 27, 2020

Related U.S. Application Data

(60) Provisional application No. 62/810,997, filed on Feb. 27, 2019.

(51) Int. Cl.
| | |
|---|---|
| *H04N 7/12* | (2006.01) |
| *H04N 19/44* | (2014.01) |
| *H04N 19/176* | (2014.01) |
| *H04N 19/159* | (2014.01) |
| *H04N 19/107* | (2014.01) |
| *H04N 19/46* | (2014.01) |
| *H04N 19/189* | (2014.01) |

(52) U.S. Cl.
CPC ........... *H04N 19/44* (2014.11); *H04N 19/107* (2014.11); *H04N 19/159* (2014.11); *H04N 19/176* (2014.11); *H04N 19/189* (2014.11); *H04N 19/46* (2014.11)

(58) Field of Classification Search
CPC .................................................. H04N 19/157
See application file for complete search history.

(56) References Cited

U.S. PATENT DOCUMENTS

| | | |
|---|---|---|
| 2018/0184117 A1 | 6/2018 | Chen et al. |
| 2018/0278949 A1 | 9/2018 | Karczewicz et al. |

FOREIGN PATENT DOCUMENTS

| | | |
|---|---|---|
| CN | 107172432 A | 9/2017 |
| WO | WO 2018237303 A1 | 12/2018 |

OTHER PUBLICATIONS

China National Intellectual Property Administration, International Search Report and Written Opinion for PCT/CN2020/076993, dated Jun. 2, 2020.

*Primary Examiner* — Y Lee
(74) *Attorney, Agent, or Firm* — Han IP PLLC; Andy M. Han

(57) ABSTRACT

A video decoder that implements a mutually exclusive grouping of coding modes is provided. The video decoder receives data for a block of pixels to be decoded as a current block of a current picture of a video. When a first coding mode for the current block is enabled, a second coding mode is disabled for the current block, wherein the first and second coding modes specify different methods for computing an inter-prediction for the current block. The current block is decoded by using an inter-prediction that is computed according to an enabled coding mode.

7 Claims, 15 Drawing Sheets

| | 6 | 4 | 2 | -2 |
|---|---|---|---|---|
| 6 | 6 | 5 | 3 | 0 |
| 6 | 6 | 5 | 4 | 2 |
| 6 | 6 | 5 | 4 | 3 |
| 6 | 6 | 5 | 4 | 3 |

MUTUAL EXCLUDING SETTINGS FOR MULTIPLE TOOLS

CROSS REFERENCE TO RELATED PATENT APPLICATION(S)

The present disclosure is part of a non-provisional application that claims the priority benefit of U.S. Provisional Patent Application No. 62/810,997, filed on 27 Feb. 2019, respectively. Contents of above-listed applications are herein incorporated by reference.

TECHNICAL FIELD

The present disclosure relates generally to video processing. In particular, the present disclosure relates to methods of signaling coding modes.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video decoder that implements mutual exclusive grouping of coding modes or tools. The decoder receives data for a block of pixels to be decoded as a current block of a current picture of a video. When a first coding mode for the current block is enabled, the decoder disables a second coding mode for the current block, wherein the first and second coding modes specify different methods for computing an inter-prediction for the current block. In another word, the second coding mode for the current block can be applied only when the first coding mode is disabled. The decoder decodes the current block by using an inter-prediction that is computed according to the enabled coding mode.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Merge Mode

Figure 1:
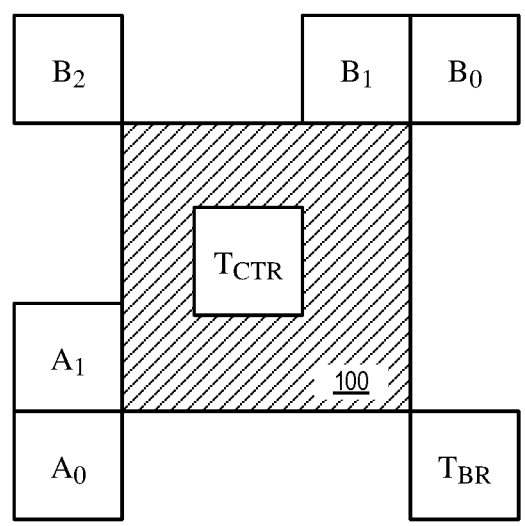
FIG. 1 illustrates the motion candidates of merge mode.

FIG. 1 illustrates the motion candidates of merge mode. As illustrated, up to four spatial MV candidates are derived from A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip, or Merge modes based on the rate-distortion optimization (RDO) decision and transmits the index to a video decoder. (Skip mode and merge mode are collectively referred to as "merge mode" in this document.)

II. Decoder Motion Vector Refinement (DMVR)

In order to increase the accuracy of the MVs of the merge mode, in some embodiments, a bilateral-matching based decoder side motion vector refinement, or DMVR is applied. In bi-prediction operation, the video codec searches for a refined MV around the initial MVs in the reference picture list L0 and reference picture list L1. The bilateral-matching method calculates the distortion between the two candidate blocks in the reference picture list L0 and list L1.

Figure 2:
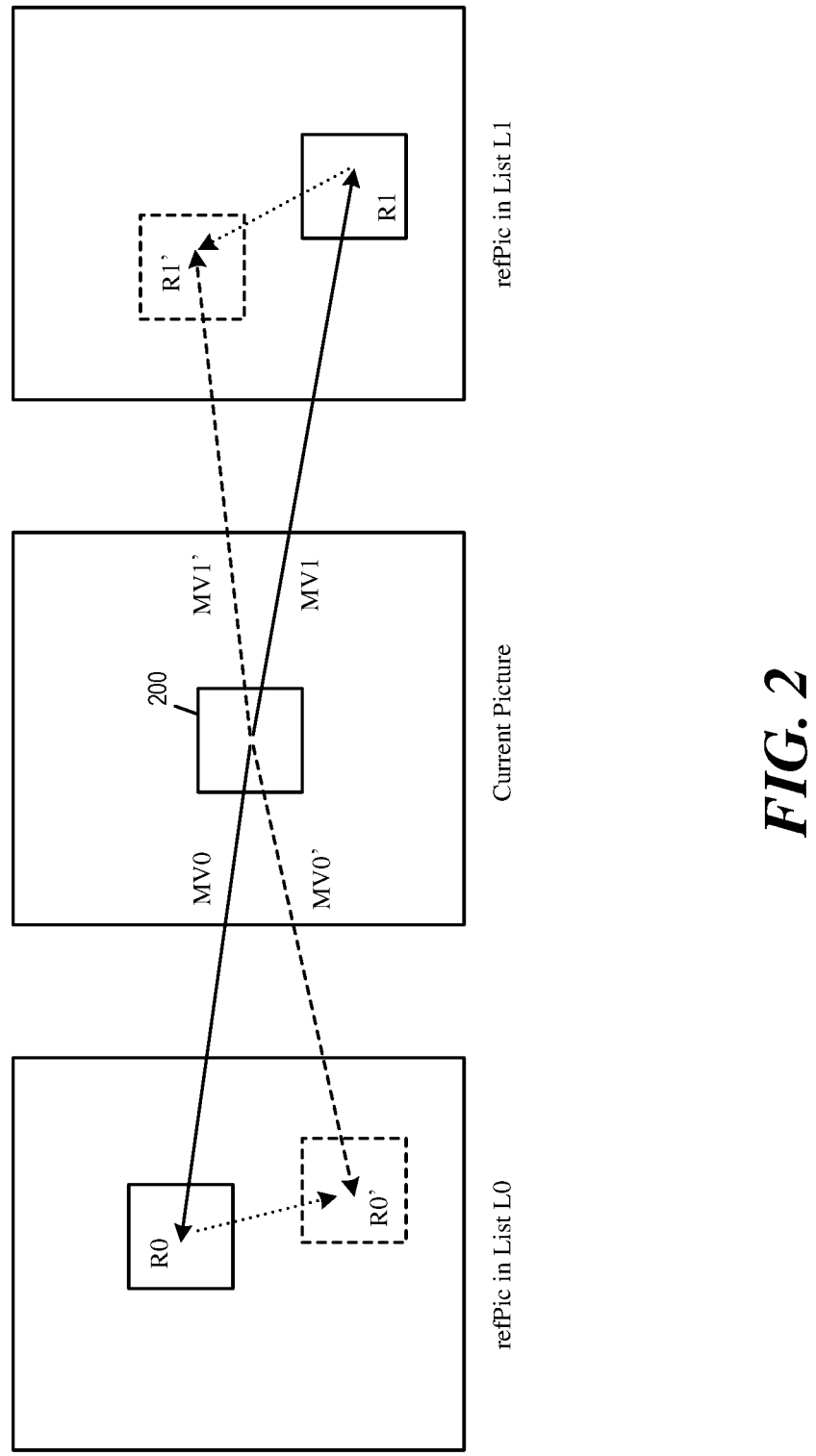
FIG. 2 conceptually illustrates using bilateral-matching based decoder side motion vector refinement to encode or decode a current block.

FIG. 2 conceptually illustrates using bilateral-matching based decoder side motion vector refinement to encode or decode a current block 200. As illustrated, SADs (sums of absolute deviations) are calculated for MV candidates (e.g., MV0' and MV1') around an initial MV (e.g., MV0 and MV1) based on the differences between pixels referenced by those MV candidates (e.g., R0' or R1') and the current block 200. The MV candidate with the lowest SAD becomes the refined MV and used to generate the bi-predicted signal.

In some embodiments, DMVR is applied as follows. The CU is split into multiple of 16×16, 16×8, or 8×16 luma subblocks (and corresponding chroma subblocks) for DMVR with luma CB width or height>16. Next, DMVR for each subblock or small CU is early terminated when SAD of zero MVD position (referred by initial MV, denoted as MV0 and MV1) between list0 and list1 is small. 25-point SAD-based integer-step search (i.e., ±2 integer-step refinement search range), search region fractional samples are generated by bilinear interpolation.

In some embodiments, DMVR is applied for the CUs which are coded when the enabling conditions for DMVR are satisfied. In some embodiments, the enabling conditions for DMVR can be any subset of (i) to (v). (i) CU level merge mode with bi-prediction MV; (ii) one reference picture is in the past and another reference picture is in the future with respect to the current picture; (iii) the distances (i.e. picture order count or POC difference) from both reference pictures to the current picture are same; and (iv) CU has more than 64 luma samples; (v) Both CU height and CU width are more than or equal to 8 luma samples.

The refined MV derived by DMVR process is used to generate the inter prediction samples and also used in temporal motion vector prediction for future pictures coding. While the original MV is used in deblocking process and also used in spatial motion vector prediction for future CU coding.

a. Searching Scheme

As shown in FIG. 2 the search points surround the initial MV and the MV offset obey the MV difference mirroring rule. In other words, any points that are checked by DMVR, denoted by candidate MV pair (MV0, MV1) obey the following two equations:

$$MV0' = MV0 + MV\_offset$$

$$MV1' = MV1 - MV\_offset$$

Where MV_offset represents the refinement offset between the initial MV and the refined MV in one of the reference pictures. In some embodiments, the refinement search range is two integer luma samples from the initial MV.

Figure 3:
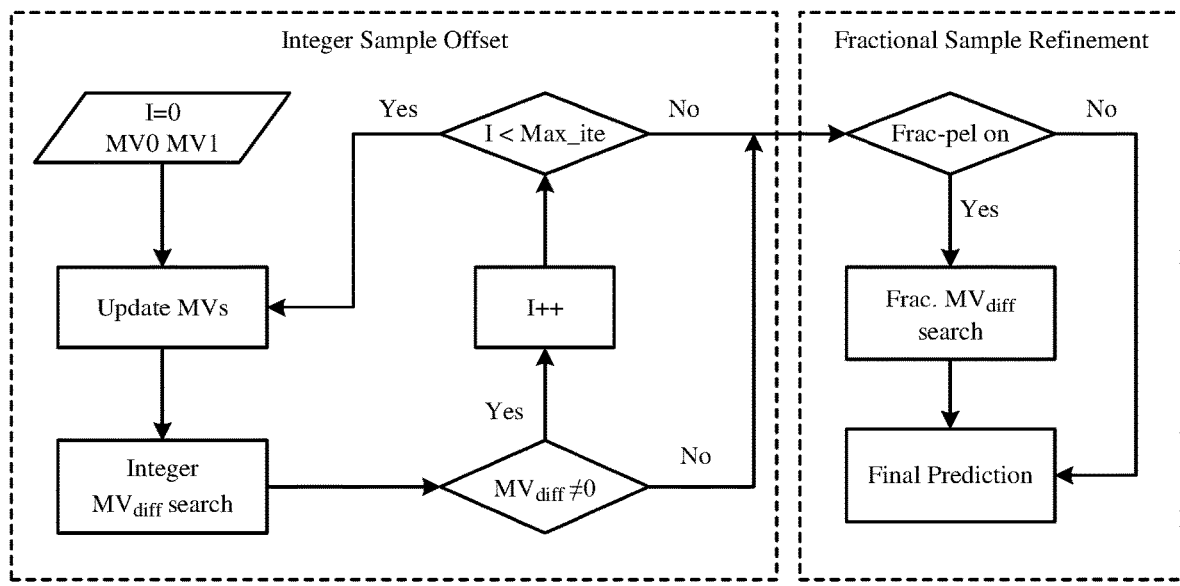
FIG. 3 illustrates the searching process of Decoder Motion Vector Refinement (DMVR).

FIG. 3 illustrates the searching process of DMVR. As shown in the figure, the searching includes the integer sample offset search stage and fractional sample refinement stage.

Figure 4:
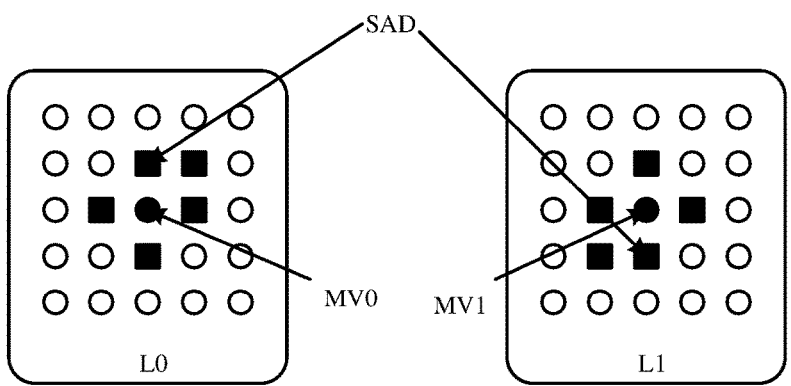
FIG. 4 illustrates a DMVR integer luma sample search pattern.

FIG. 4 illustrates a DMVR integer luma sample search pattern. As illustrated, 25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

Returning to FIG. 3. The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0)))$$

$$y_{min}=(E(0,-1)-E(0,1))/(2((0,-1)+E(0,1)-2E(0,0)))$$

The value of $x_{min}$ and $y_{min}$ are automatically constrained to be between 8 and 8 since all cost values are positive and the smallest value is E(0,0). This corresponds to half peal offset with 1/16th-pel MV accuracy in VTM4. The computed fractional $(x_{min}, y_{min})$ are added to the integer distance refinement MV to get the sub-pixel accurate refinement delta MV.

b. Bilinear Interpolation and Sample Padding

In some embodiments, the resolution of the MVs is 1/16 luma samples. The samples at the fractional position are interpolated using an 8-tap interpolation filter. In DMVR, the search points are surrounding the initial fractional-pel MV with integer sample offset, therefore the samples of those fractional position needs to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

c. Maximum DMVR Processing Unit

In some embodiments, when the width and/or height of a CU are larger than 16 luma samples, it is further into sub-blocks with width and/or height equal to 16 luma samples. The maximum unit size for DMVR searching process is limit to 16×16.

III. Weighted Prediction (WP)

Weighted prediction (WP) is a coding tool supported by the H.264/AVC and HEVC standards to efficiently code video content with fading. Support for WP was also added into the VVC standard. WP allows weighting parameters (weight and offset) to be signaled for each reference picture in each of the reference picture lists L0 and L1. Then, during motion compensation, the weight(s) and offset(s) of the corresponding reference picture(s) are applied.

IV. Lighting Based Prediction Offset

As mentioned, inter predictions explores the correlations of pixels between frames and will be efficient if the scene are stationary, and motion estimation can easily find similar blocks with similar pixel values in the temporal neighboring frames. However, in some practical cases, frames will be shot with different lighting conditions. The pixel values between frames will be different even if the content is similar and the scene is stationary.

In some embodiments, Neighboring-derived Prediction Offset (NPO) is used to add prediction offset to improve the motion compensated predictors. With this offset, the different lighting conditions between frames can be considered. The offset is derived using neighboring reconstructed pixels (NRP) and extended motion compensated predictors (EMCP).

Figures 5, 6:
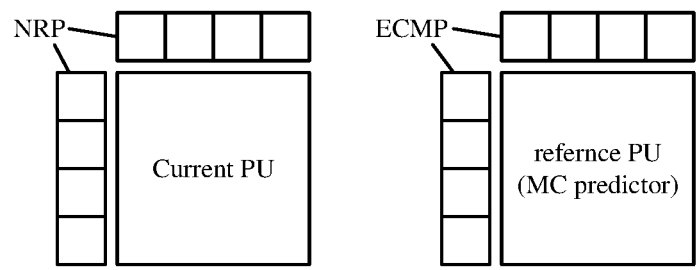
FIG. 5 conceptually illustrates deriving lighting-based prediction offset.
FIG. 6 illustrates an example derivation of prediction offset.

FIG. 5 conceptually illustrates deriving lighting-based prediction offset. The patterns chosen for NRP and EMCP are N pixels left and M pixels above to the current PU, where N and M are predetermined values. The patterns can be of any size and shape and can be decided according to any encoding parameters, such as PU or CU sizes, as long as they are the same for both NRP and EMCP. The offset is calculated as the average pixel value of NRP minus the average pixel value of EMCP. This derived offset will be unique over the PU and applied to the whole PU along with the motion compensated predictors.

FIG. 6 illustrates an example derivation of prediction offset. First, for each neighboring position (left and above to the boundaries, shaded in grey), the individual offset is calculated as the corresponding pixel in NRP minus the pixel in EMCP. In the example, offset values of 6, 4, 2, −2 are generated for the above and 6, 6, 6, 6 for the left neighboring positions. Second, when all individual offsets are calculated and obtained, the derived offset for each position in the current PU will be the average of the offsets from the left and above positions. For example, at the first position in the top left corner, offset of 6 is generated by averaging the offset from left and above. For the next position, the offset is equal to (6+4)/2, that is, 5. The offset for each position can be processed and generated in raster scan order sequentially. Since the neighboring pixels are more highly correlated to the boundary pixels, so do the offsets. This method can adapt the offset according to the pixel positions. The derived offsets will be adapted over the PU and applied to each PU position individually along with the motion compensated predictors.

In some embodiments, Local Illumination Compensation (LIC) is used to modify the result of inter-prediction. LIC is a method of inter prediction that uses neighbor samples of current block and reference block to generate a linear model that is characterized by a scaling factor a and an offset b. The scaling factor a and the offset b are derived by referring to the neighbor samples of current block and reference block. LIC mode may be enabled or disabled adaptively for each CU.

V. Generalized Bi-Prediction (GBi)

Generalized bi-prediction (GBi) is a method of inter-prediction that uses different weights for predictors from L0 and L1, respectively, rather than using equal weights as in traditional bi-prediction. GBI is also referred to as Bi-prediction with weighted averaging (BWA) or Bi-prediction with CU-level weight (BCW). In HEVC, the bi-prediction signal is generated by averaging two prediction signals obtained from two different reference pictures and/or using two different motion vectors. In some embodiments, the bi-prediction mode is extended beyond simple averaging to allow weighted averaging of the two prediction signals.

$$P_{bi\text{-}pred} = ((8-w)*P_0 + w*P_1 + 4) \gg 3$$

In some embodiments, five different possible weights are allowed in the weighted averaging bi-prediction, or $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. Weighted averaging of bi-prediction is only applied to CUs with 256 or more luma samples (i.e., CU width times CU height is greater than or equal to 256). For low-delay pictures, all 5 weights are used. For non-low-delay pictures, only three different possible weights are used ($w \in \{3,4,5\}$).

In some embodiments, at the video encoder, fast search algorithms are applied to find the weight index without significantly increasing the encoder complexity. When combined with AMVR, which allows MVD of the CU to be coded in different precision, unequal weights are conditionally checked for 1-pel and 4-pel motion vector precisions if the current picture is a low-delay picture. When combined with affine, affine Motion Estimation (ME) will be performed for unequal weights if and only if the affine mode is selected as the current best mode. When the two reference pictures used for bi-prediction are the same, unequal weights are conditionally checked. Unequal weights are not searched when certain conditions are met, depending on the POC (picture order count) distance between current picture and its reference pictures, the coding QP (quantization parameter), and the temporal level.

VI. Bi-Directional Optical Flow (BDOF)

In some embodiments, the bi-directional optical flow, BDOF, also referred to as BIO, is used to refine the bi-prediction signal of a CU at the 4×4 sub-block level. Specifically, a video codec refines the bi-prediction signal by using sample gradients and a set of derived displacement.

BDOF is applied to a CU when the enabling conditions are satisfied. In some embodiments, the enabling conditions for BDOF can be any subset of (1) to (4). 1) both CU height and CU width are larger than or equal to 8 luma samples; 2) the CU is not coded using affine mode or the ATMVP merge mode, which belongs to subblock merging mode; 3) the CU is coded using "true" bi-prediction mode, i.e., one of the two reference pictures is prior to the current picture in display order and the other is after the current picture in display order; (4) CU has more than 64 luma samples. In some embodiments, BDOF is only applied to the luma component.

The BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = (I^{(k)}(i+1, j) \gg shift1 - I^{(k)}(i-1, j) \gg shift1)$$

$$\frac{\partial I^{(k)}}{\partial y}(i, j) = (I^{(k)}(i, j+1) \gg shift1 - I^{(k)}(i, j-1) \gg shift1)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth-6). Then, the auto- and cross-correlation of the gradients, $S_1, S_2, S_3, S_5$ and $S_6$, are calculated as $$S_1 = \sum_{(i,j) \in \Omega} \text{Abs}(\psi_x(i, j)), S_3 = \sum_{(i,j) \in \Omega} \theta(i, j) \cdot \text{Sign}(\psi_x(i, j))$$

$$S_2 = \sum_{(i,j) \in \Omega} \psi_x(i, j) \cdot \text{Sign}(\psi_y(i, j))$$

$$S_5 = \sum_{(i,j) \in \Omega} \text{Abs}(\psi_y(i, j)), S_6 = \sum_{(i,j) \in \Omega} \theta(i, j) \cdot \text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

where $\Omega$ is a 6×6 window around the 4×4 sub-block and the values of $n_a$ and $n_b$ are set equal to min(1, bitDepth-11) and min(4, bitDepth-8), respectively. The motion refinement $(v_x, v_y)$ is then derived using the cross- and auto-correlation terms using the following:

$$v_x = S_1 > 0 ? \text{clip3}(-th'_{BIO}, th'_{BIO}, -((S_3 \cdot 2^{n_b - n_a}) \gg \lfloor \log_2 S_1 \rfloor)) : 0$$

$$v_y = S_5 > 0 ? \text{clip3}(-th'_{BIO}, th'_{BIO}, -((S_6 \cdot 2^{n_b - n_a} - ((v_x S_{2,m}) \ll n_{s_2} + v_x S_{2,s})/2) \gg \lfloor \log_2 S_5 \rfloor)) : 0$$

where $S_{2,m} = S_2 \gg n_{S_2}$, $S_{2,s} = S_2 \& (2^{n_{S_2}} - 1)$, $th'_{BIO} = 2^{13-BD}$, and $\lfloor \cdot \rfloor$ is the floor function. Based on the motion refinement and the gradients, the following adjustment is calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right) / 2\right)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg shift$$

In some embodiments, the values of $n_a$, $n_b$ and $n_{S_2}$ are equal to 3, 6, and 12, respectively. In some embodiments, these values are selected such that the multipliers in the BDOF process do not exceed 15-bit, and the maximum bit-width of the intermediate parameters in the BDOF process is kept within 32-bit. In order to derive the gradient values, some prediction samples $I^{(k)}(i,j)$ in list k (k=0,1) outside of the current CU boundaries need to be generated.

Figure 7:
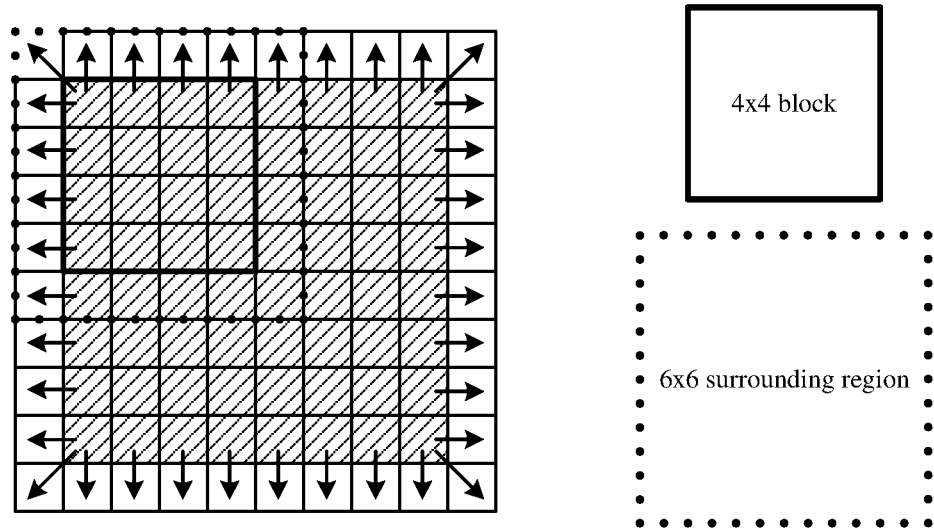
FIG. 7 illustrates extended CU region used by BDOF for coding a CU.

In some embodiments, BDOF uses one extended row/column around the CU's boundaries. FIG. 7 illustrates extended CU region used by BDOF for coding a CU. In order to control the computational complexity of generating the out-of-boundary prediction samples, bilinear filter is used to generate prediction samples in the extended area (white positions of the CU), and the normal 8-tap motion compensation interpolation filter is used to generate prediction samples within the CU (shaded positions of the CU). These extended sample values are used in gradient calculation only. For the remaining steps in the BDOF process, if any sample and gradient values outside of the CU boundaries are needed, they are padded (i.e. repeated) from their nearest neighbors.

VII. Combined Inter and Intra Prediction (CIIP)

In some embodiments, when the enabling conditions for CIIP are satisfied, the CU-level syntax for CIIP is signaled. For example, an additional flag is signaled to indicate if the combined inter/intra prediction (CIIP) mode is applied to the current CU. The enabling conditions may include the CU is coded in merge mode, and the CU contains at least 64 luma samples (that is, CU width times CU height is equal to or larger than 64), In order to form the CIIP prediction, an intra prediction mode is needed. One or more possible intra prediction modes can be used: for example, DC, planar, horizontal, or vertical. Then, the inter prediction and intra prediction signals are derived using regular intra and inter decoding processes. Finally, weighted averaging of the inter and intra prediction signals is performed to obtain the CIIP prediction.

In some embodiments, if only one intra prediction mode (e.g. planar) is available for CIIP, the intra prediction mode for CIIP can be implicitly assigned with that mode (e.g. planar). In some embodiments, up to 4 intra prediction modes, including DC, PLANAR, HORIZONTAL, and VERTICAL modes, can be used to predict the luma component in the CIIP mode. For example, if the CU shape is very wide (that is, width is more than two times of height), then the HORIZONTAL mode is not allowed; if the CU shape is very narrow (that is, height is more than two times of width), then the VERTICAL mode is not allowed. In these cases, only 3 intra prediction modes are allowed. The CIIP mode may use three most probable modes (MPM) for intra prediction. If the CU shape is very wide or very narrow as defined above, the MPM flag is inferred to be 1 without signalling. Otherwise, an MPM flag is signalled to indicate if the CIIP intra prediction mode is one of the CIIP MPM candidate modes. If the MPM flag is 1, an MPM index is further signalled to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode. The intra prediction mode of a CIIP-coded CU will be saved and used in the intra mode coding of the future neighbouring CUs.

The inter prediction signal (or inter-prediction) in the CIIP mode $P_{inter}$ is derived using the same inter prediction process applied to regular merge mode; and the intra-prediction or intra prediction signal $P_{intra}$ is derived using the CIIP intra prediction mode following the regular intra prediction process. The intra and inter prediction signals are then combined using weighted averaging, where the weight value depends on the neighboring blocks, depends on the intra prediction mode, or depends on where the sample is located in the coding block. In some embodiments, if the intra prediction mode is the DC or planar mode, or if the block width or height is smaller than 4, then equal weights are applied to the intra prediction and the inter prediction signals. Otherwise, the weights are determined based on the intra prediction mode (either horizontal mode or vertical mode in this case) and the sample location in the block. Starting from the part closest to the intra prediction reference samples and ending at the part farthest away from the intra prediction reference samples, the weight wt for each of the 4 regions is set to 6, 5, 3, and 2, respectively. In some embodiments, the CIIP prediction or CIIP prediction signal $P_{CIIP}$ is derived according to:

$$P_{CIIP}=((N1-wt)P_{inter}+wt*P_{intra}+N2)>>N3$$

Where (N1, N2, N3)=(8, 4, 3) or (N1, N2, N3)=(4, 2, 2). When (N1, N2, N3)=(4, 2, 2), wt is selected from 1, 2, or 3.

VIII. Diffusion Filter (DIF)

Diffusion filter for video coding is to using diffusion filter to apply to prediction signals in video coding. Let pred be the prediction signal on a given block obtained by intra or motion compensated prediction. In order to handle boundary points for the filters, the prediction signal is extended to a prediction signal $pred_{ext}$. This extended prediction is formed by adding one line of reconstructed samples left and above the block to the prediction signal and then the resulting signal is mirrored in all directions.

A Uniform Diffusion Filter is realized by convolving the prediction signal with a fixed mask $h^I$. In some embodiments, the prediction signal pred is replaced by $h^I*pred$, using the aforementioned boundary extension. Here, the filter mask $h^I$ is defined as $$h^I = 0.125 \begin{pmatrix} 0 & 1 & 0 \\ 1 & 4 & 1 \\ 0 & 1 & 0 \end{pmatrix}.$$

Directional Diffusion Filters such as a horizontal filter $h^{hor}$ and a vertical filter $h^{ver}$, are used which have a fixed mask. The filtering is restricted to be either applied only along the vertical or along the horizontal direction. The vertical filter is realized by applying the fixed filter mask $h^{ver}$ $$h_{ver} = (0.5)^4 \begin{pmatrix} 1 \\ 0 \\ 4 \\ 0 \\ 6 \\ 0 \\ 4 \\ 0 \\ 1 \end{pmatrix}$$

to the prediction signal and the horizontal filter is realized by using the transposed mask $h_{hor}=h_{ver}^t$.

The extension of the prediction signal is performed in exactly the same way as for uniform diffusion filter.

IX. Bilateral Filtering (BIF)

Performing quantization in the transform domain is a well-known technique for better preserving information in images and video compared to quantizing in the pixel domain. However, it is also well known that quantized transform blocks may produce ringing artifacts around edges, both in still images and in moving objects in videos. Applying a bilateral filter (BIF) may significantly reduce ringing artifacts. In some embodiments, a small, low-complex bilateral filter is applied on reconstructed samples directly after the inverse transform has been performed and combined with the predicted sample values.

Figure 8:
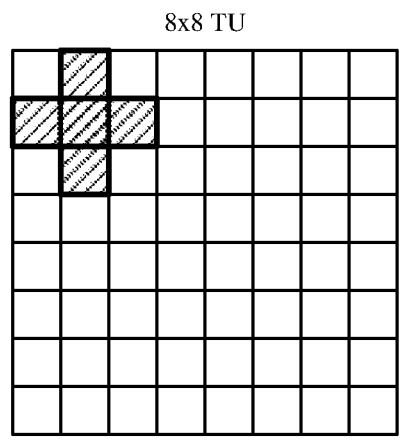
FIG. 8 illustrates an example 8×8 Transform unit block and a bilateral filter aperture.
Figure 8:
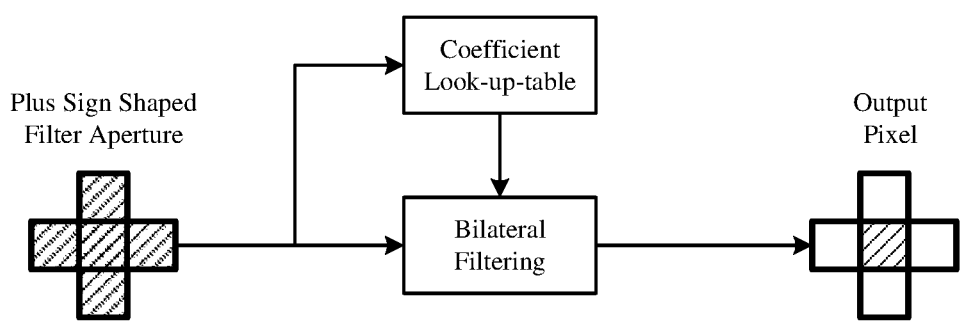

In some embodiments, when bilateral filter is applied, each sample in the reconstructed picture is replaced by a weighted average of itself and its neighbors. The weights are calculated based on the distance from the center sample as well as the difference in sample values. FIG. 8 illustrates an example 8×8 Transform unit block and a bilateral filter aperture. The filter aperture is for a sample located at (1,1). As illustrated, because the filter is in the shape of a small plus sign as shown in FIG. 1, all of the distances are 0 or 1. A sample located at (i, j), is filtered using its neighboring sample (k, l). The weight ω(i, j, k, l) is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)}$$

I(i, j) and I(k, l) are the original reconstructed intensity value of samples (i, j) and (k,l) respectively. $\sigma_d$ is the spatial parameter, and $\sigma_r$ is the range parameter. The properties (or strength) of the bilateral filter is controlled by these two parameters. Samples located closer to the sample to be filtered, and samples having smaller intensity difference to the sample to be filtered, have larger weight than samples further away and with larger intensity difference. In some embodiments, $\sigma_d$ is set based on the transform unit size, and $\sigma_r$ is set based on the QP used for the current block, specifically:

$$\sigma_d = 0.92 - \frac{\min(TU \text{ block width}, TU \text{ block height})}{40}$$

$$\sigma_r = \max\left(\frac{(QP-17)}{2}, 0.01\right)$$

In some embodiments, bilateral filter is applied to each TU block directly after the inverse transform in both the encoder and the decoder. As a result, subsequent Intra-coded blocks are predicted from the sample values that have been filtered with the bilateral filter. This also makes it possible to include the bilateral filter operation in the Rate-Distortion decisions in the encoder.

In some embodiments, each sample in the transform unit is filtered using its direct neighboring samples only. The filter has a plus sign shaped filter aperture centered at the sample to be filtered. The output filtered sample value $I_D(i,j)$ is calculated as:

$$I_D(i, j) = \frac{\sum_{k,l} I(k, l) * \omega(i, j, k, l)}{\sum_{k,l} \omega(i, j, k, l)}$$

For TU sizes larger than 16×16, the block is treated as several 16×16 blocks using TU block width=TU block height=16. Also, rectangular blocks are treated as several instances of square blocks. In some embodiments, in order to reduce the number of calculations, the bilateral filter is implemented using a look-up-table (LUT) storing all weights for a particular QP in a two-dimensional array. The LUT uses the intensity difference between the sample to be filtered and the reference sample as the index of the LUT in one dimension, and the TU size as the index in the other dimension. For efficient storage of the LUT, in some embodiments, the weights are rounded to 8-bit precision.

X. Hadamard Transform Domain Filter (HAD)

In some embodiments, Hadamard transform domain filter (HAD) is applied to luma reconstructed blocks with non-zero transform coefficients, excluding 4×4 blocks and if quantization parameter is larger than 17. The filter parameters are explicitly derived from the coded information. The HAD filter, if applied, is performed on decoded samples right after block reconstruction. The filtered result is used both for output as well as for spatial and temporal prediction. The filter has same implementation both for intra and inter CU filtering. According to HAD filter, for each pixel from reconstructed block pixel processing comprises the following steps: (1) scan for 4 neighboring pixels around processing pixel including current one according to scan pattern, (2) 4-point Hadamard transform of read pixels, and (3) spectrum filtering based on the following formula:

$$F(i, \sigma) = \frac{R(i)^2}{R(i)^2 + m*\sigma^2} * R(i)$$

wherein (i) is index of spectrum component in Hadamard spectrum, R(i) is spectrum component of reconstructed pixels corresponding to index, m=4 is normalization constant equal to number of spectrum components, σ is filtering parameter deriving from codec quantization parameter QP using following equation:

$$\sigma = 2.64 * 2^{(0.1296*(QP-11))}$$

The first spectrum component corresponding to DC value is bypassed without filtering. Inverse 4-point Hadamard transform of filtered spectrum. After the filtering step, the filtered pixels are placed to its original positions into accumulation buffer. After completing filtering the pixels, the accumulated values are normalized by number of processing groups used for each pixel filtering. Due to use of padding of one sample around the block number of processing groups is equal to 4 for each pixel in the block and normalization is performed by right shifting on 2 bits.

Figure 9:
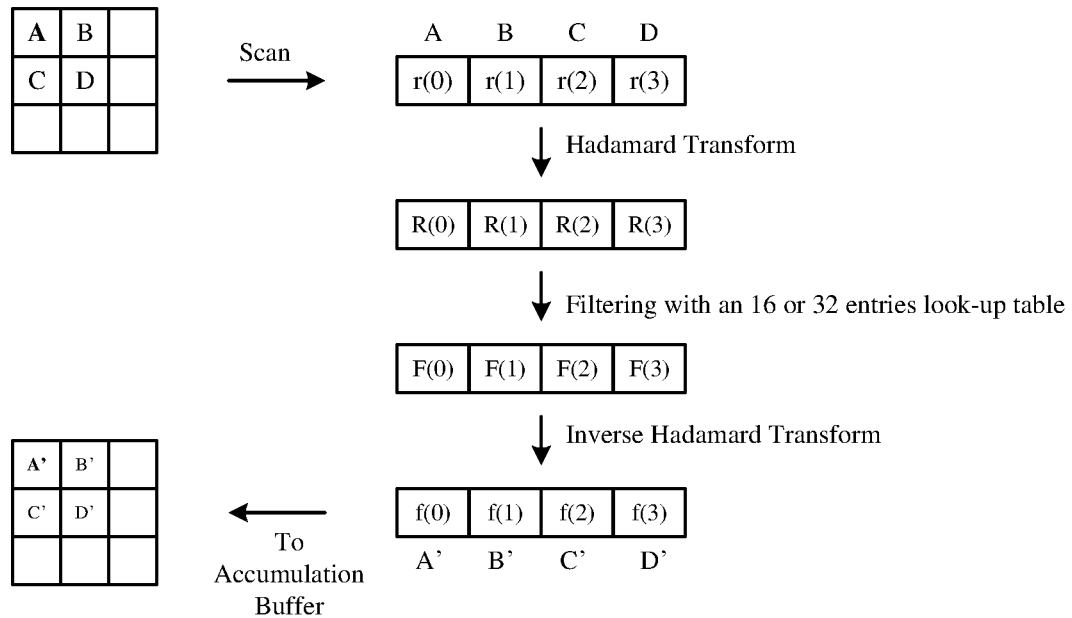
FIG. 9 illustrates the filtering process under Hadamard transform domain filter.

FIG. 9 illustrates the filtering process under Hadamard transform domain filter. As illustrated, equivalent filter shape is 3×3 pixels. In some embodiments, all pixels in the block can be processed independently for maximum parallelism. The results of 2×2 groups filtering may be reused for spatial collocated samples. In some embodiments, one 2×2 filtering is performed for each new pixel in the block, the remaining three are reused.

XI. Triangle Prediction Unit Mode (TPM)

In some embodiments, triangular prediction unit mode (TPM) is used to perform inter-prediction for a CU. Under TPM, a CU is split into two triangular prediction units, in either diagonal or inverse diagonal direction. Each triangular prediction unit in the CU is inter-predicted using its own uni-prediction motion vector and reference frame. In other words, the CU is partitioned along a straight line bifurcating the current block. The transform and quantization process are then applied to the whole CU. In some embodiments, this mode is only applied to skip and merge modes. In some embodiment, TPM can be extended as splitting a CU into two prediction units with a straight line, which can be represented by an angle and a distance. The splitting line can be indicated with a signaled index and the signaled index is then mapped to an angle and a distance. In addition, one or more indexes are signaled to indicate the motion candidates for the two partitions. After predicting each prediction unit, an adaptive weighting process is applied to the diagonal edge between the two prediction units to derive the final prediction for the whole CU.

Figure 10:
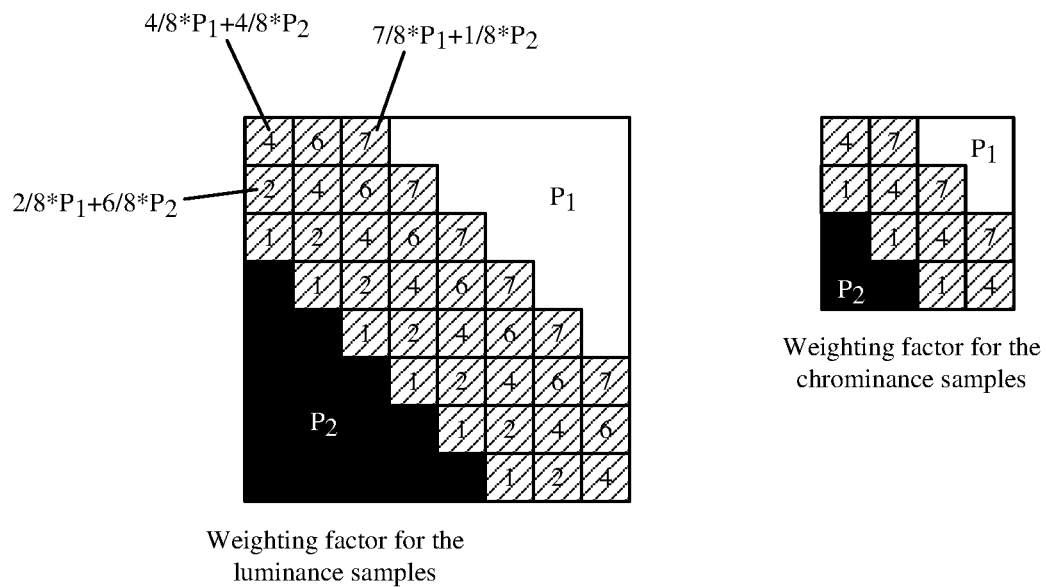
FIG. 10 illustrates the adaptive weighting that is applied along the diagonal edge between the two triangular prediction units.

FIG. 10 illustrates an example of adaptive weighting that is applied along the diagonal edge between the two triangular prediction units. A first weighting factor groups of {7/8, 6/8, 4/8, 2/8, 1/8} and {7/8, 4/8, 1/8} are used for the luminance and the chrominance samples, respectively. A second weighting factor group: {7/8, 6/8, 5/8, 4/8, 3/8, 2/8, 1/8} and {6/8, 4/8, 2/8} are used for the luminance and the chrominance samples, respectively. One weighting factor group is selected based on the comparison of the motion vectors of two triangular prediction units. The second weighting factor group is used when the reference pictures of the two triangular prediction units are different from each other or their motion vector difference is larger than 16 pixels. Otherwise, the first weighting factor group is used.

XII. Mutual Excluding Group

In some embodiments, to simplify the hardware implementation complexity, mutual excluding rules are implemented to limit the cascading of the different tools or coding modes described above in Sections I through XI. Cascading hardware implementation of tools or coding modes makes the hardware design more difficult and results in longer pipeline latency. By implementing mutual excluding rule, pipeline stages can be made shorter, and the hardware utilization ratio can be made higher (i.e., less idle hardware). In general, the mutual excluding rules are for ensuring that tools or coding modes in a certain set of two or more tools or coding modes are not simultaneously enabled for coding a current CU.

In some embodiments, a mutual excluding group of multiple (e.g., four) tools or coding modes are implemented. The mutual excluding group may include some or all of the following coding modes or tools: GBI (Generalized bi-prediction), CIIP, (Combined inter and intra prediction), BDOF (bi-directional optical flow), DMVR (Decoder side motion vector refinement), and weighted prediction (WP).

In some embodiment, for any CU, the prediction stage of a video codec (video encoder or video decoder) implements mutual excluding rules among some of the prediction tools or coding modes. The mutual excluding means that only one of some coding tools is activated for coding alone, no two of the coding tools are activated for the same CU. Specifically, it can define a mutual excluding group of tools, in that group, for any CU, only one of the tools in the group is activated for coding, no two tools inside the same mutual excluding group are activated for the same CU. In some embodiments, different CUs may have different tools activated.

For some embodiments, the mutual excluding group includes GBI, BDOF, DMVR, CIIP, WP. That is, for any CU, only one of the tools in the group is activated for coding, no two of them are activated for the same CU among GBI, BDOF, DMVR, CIIP, and WP. For example, DMVR/BDOF/GBI cannot be applied when CIIP flag is equal to 1. In another word, DMVR/BDOF/GBI can be applied (if other enabling conditions for DMVR/BDOF/GBI are satisfied) when CIIP flag is equal to 0. In some embodiments, the mutual excluding group includes any two or three or some subset of GBI, BDOF, DMVR, CIIP, and WP. Specifically, the mutual excluding group may include BDOF, DMVR, CIIP; the mutual excluding group may include GBI, DMVR, CIIP; the mutual excluding group may include GBI, BDOF, CIIP; the mutual excluding group may include GBI, BDOF, DMVR; the mutual excluding group may include GBI and BDOF; the mutual excluding group may include GBI and DMVR; the mutual excluding group may include GBI and CIIP; the mutual excluding group may include BDOF, DMVR, CIIP; the mutual excluding group may include BDOF and CIIP; the mutual excluding group may include DMVR and CIIP. For example of the mutual excluding group, including GBI, BDOF, CIIP, if CIIP is enabled (ciip_flag equal to 1), BDOF is off and GBI is off (which means equal weights are used to blend the inter predictions from list-0 and list-1 regardless of BCW weight index). For example of the mutual excluding group, including GBI, DMVR, CIIP, if CIIP is enabled (ciip_flag equal to 1), DMVR is off and GBI is off (which means equal weights are used to blend the inter predictions from list-0 and list-1 regardless of BCW weight index). For example of the mutual excluding group, including GBI, DMVR, if GBi is enabled (GBi weight index indicates unequal weights), DMVR is off. For example of the mutual excluding group, including GBI, BDOF, if GBi is enabled (GBi weight index indicates unequal weights), BDOF is off.

According to the mutual excluding rule, the related syntax elements can be saved (or omitted from bitstream). For example, if the mutual excluding group includes GBI, BDOF, DMVR, CIIP, then, if CIIP mode is not enabled for the current CU (for example, it's GBI or BDOF or DMVR), the CIIP flag or syntax elements can be saved or omitted (not sent from encoder to decoder) for this CU because CIIP is turned off by the excluding rule. For some other embodiments of mutual excluding group, the related syntax elements can be saved or omitted for the excluded or the disabled tool for one certain CU.

In some embodiments, a priority rule is applied to a mutual excluding group. In some embodiments, each tool inside a mutual excluding group has a certain original or conventional enabling condition. The enabling condition is the original enabling rule for each tool before mutual excluding. For example, the enabling condition for DMVR includes true-bi-prediction and equal POC distance between current picture and L0 picture/L1 picture and others; the enabling condition for GBI includes bi-prediction and GBI index from syntax (when AMVP) or inherited GBI index (when merge mode).

One priority rule can be pre-defined for a mutual excluding group. Tools or coding modes inside the mutual excluding group have one priority number for each tool. If tools A and B are activated (i.e., have their enabling condition fulfilled) for the same CU, but tool A has a higher pre-defined priority than tool B (denoted as tool A>tool B), then, if tool A is activated or enabled, tool B is turned off or disabled.

Different embodiments have different priority rules for a mutual excluding group such as one that includes GBI, DMVR, BDOF, CIIP, and WP or any subset of {GBI, DMVR, BDOF, CIIP, WP}. For example, in some embodiments, the priority rule specifies that GBI>DMVR>BDOF>CIIP. In some embodiments, the priority rule specifies that GBI>DMVR>BDOF. In some embodiments, the priority rule specifies that DMVR>GBI>BDOF. In some embodiments, the priority rule specifies that DMVR>GBI. In some embodiments, the priority rule specifies that GBI>BDOF. In some embodiments, the priority rule specifies that GBI>DMVR. In some embodiments, the priority rule specifies that DMVR>GBI>BDOF>CIIP. In some embodiments, the priority rule specifies that DMVR>BDOF>GBI>CIIP. In some embodiments, the priority rule specifies that CIIP>GBI>BDOF. In some embodiments, the priority rule specifies that CIIP>GBI>DMVR. The priority rule may also specify any other order among any subset of GBI, BDOF, DMVR, CIIP. For another example, the excluding group includes {GBi, CIIP} and the priority rule specifies that CIIP>GBi, so when CIIP is used (ciip_flag equal to 1), GBi is turn off (or disabled) which means equal weights are applied to blend the predictions from list-0 and list-1. For another example, the excluding group includes {DMVR, CIIP} and the priority rule specifies that CIIP>DMVR, so when CIIP is used (ciip_flag equal to 1), DMVR is not used. For another example, the excluding group includes {BDOF, CIIP} and the priority rule specifies that CIIP>BDOF, so when CIIP is used (ciip_flag equal to 1), BDOF is not used. For another example, the excluding group includes {BDOF, GBi} and the priority rule specifies that GBi>BDOF, so when GBi is used (GBi index indicating unequal weights to blend the predictions from list-0 and list-1), BDOF is not used. For another example, the excluding group includes {DMVR, GBi} and the priority rule specifies that GBi>DMVR, so when GBi is used (GBi index indicating unequal weights to blend the predictions from list-0 and list-1), DMVR is not used.

In some embodiments, the priority rule of a mutual excluding group is not only pre-defined, but also depend on some parameters of current CU (such as CU size or current MV). For example, for a mutual excluding group that includes DMVR and BDOF, there may be an excluding rule that based on CU size or other parameter of CU that gives priority to either DMVR or BDOF when the enabling condition for both DMVR and BDOF are met. For example, in some embodiments, if the current CU size is larger than a threshold, the priority of DMVR (for tool excluding) is higher than that of BDOF. In some embodiments, if current CU size is larger than a threshold, the priority of BDOF (for tool excluding) is higher than that of DMVR.

In some embodiments, if current CU aspect ratio is larger than a threshold, the priority of DMVR (for tool excluding) is higher than that of BDOF. The aspect ratio is defined as CU_width/CU_height if CU_width>CU_height or CU_height/CU_width if CU_height>=CU_width. In some embodiments, if current CU aspect ratio is larger than a threshold, the priority of BDOF (for tool excluding) is higher than that of DMVR. In some embodiments, for some merge mode candidates (if selected for inter-prediction), the priority of DMVR (for tool excluding) is higher than that of BDOF, while for other merge candidates (if selected for inter-prediction), the priority of BDOF (for tool excluding) is higher than that of DMVR.

In some embodiments, for one true-bi-prediction merge candidate, if the mirrored (and then scaled) MV of L0 MV is very similar to L1 MV, then, the priority of DMVR (for tool excluding) is higher than that of BDOF. In some embodiments, for one true-bi-prediction merge candidate, if the mirrored (and then scaled) MV of L0 MV is very similar to L1 MV, then the priority of BDOF (for tool excluding) is higher than that of DMVR.

In some embodiments, a mutual excluding group may include some or all of the following coding modes or tools: LIC (Local illumination compensation), DIF (Uniform Luma Inter Prediction Filter or diffusion filter), BIF (Bilateral filtering), HAD filter (Hadamard transform domain filter). These tools or coding modes are applied to residual signals or prediction signals or reconstructed signals, i.e., they work on "post-stages". A post-stage is defined as a pipeline stage after prediction (intra/inter prediction) or after residual decoding or after both. In some embodiments, a mutual excluding group may also include post-stage tools or coding modes other than LIC, DIF, BIF, and HAD.

In some embodiments, a mutual excluding group may include all or a subset of the following eight coding modes or tools: GBI, BDOF, DMVR, CIIP, LIC, DIF, BIF, HAD. That is, for any CU, only one of them is activated for coding, no two coding modes or tools are activated for the same CU among GBI, BDOF, DMVR, CIIP, LIC, DIF, BIF, HAD. In some embodiments, the mutual excluding group includes LIC, DIF, BIF, HAD. In some embodiments, the mutual excluding group includes DIF, BIF, HAD. In some embodiments, the mutual excluding group includes LIC, BIF, HAD. In some embodiments, the mutual excluding group includes LIC, DIF, HAD. In some embodiments, the mutual excluding group includes LIC, DIF, BIF. In some embodiments, the mutual excluding group includes LIC and DIF. In some embodiments, the mutual excluding group includes LIC, BIF. In some embodiments, the mutual excluding group includes LIC and HAD. In some embodiments, the mutual excluding group includes DIF and BIF. In some embodiments, the mutual excluding group includes DIF and HAD. In some embodiments, the mutual excluding group includes BIF and HAD.

XIII. Signaling for Multi-Hypothesis Prediction Mode

Both CIIP and TPM generate a final prediction of current CU with two candidates. Either CIIP or TPM can be viewed as a type of multi-hypothesis prediction mode, where one hypothesis of prediction is generated by one candidate and another hypothesis of prediction is generated by another candidate. For CIIP, one candidate is from intra mode and the other candidate is from merge mode. As for TPM, the two candidates are from the candidate list for merge mode.

In some embodiments, Multi-hypothesis mode is used to improve Inter prediction, which is an improved method for Skip and/or Merge modes. In original Skip and Merge mode, one Merge index is used to select one motion candidate, which may be either uni-prediction or bi-prediction derived by the candidate itself, from the Merge candidate list. The generated motion compensated predictor is referred to as the first hypothesis (or first prediction) in some embodiments. Under Multi-hypothesis mode, a second hypothesis is produced in addition to the first hypothesis. The second hypothesis of predictors can be generated by motion compensation from a motion candidate based on an inter prediction mode, (e.g., Merge or Skip modes), or by intra prediction based on an intra prediction mode.

When the second hypothesis (or second prediction) is generated by an Intra prediction mode, the Multi-hypothesis mode is referred to as MH mode for Intra or MH mode Intra or MH Intra or Inter-intra mode. A CU coded by CIIP is coded by using MH mode for Intra. When the second hypothesis is generated by motion compensation by a motion candidate or an inter prediction mode (e.g., Merge or Skip mode), the Multi-hypothesis mode is referred to as MH mode for Inter or MH mode Inter or MH Inter (or also called as MH mode for Merge or MH Merge). The diagonal edge region of a CU coded by TPM is coded by using MH mode for Inter.

For Multi-hypothesis mode, each Multi-hypothesis candidate (or called each candidate with Multi-hypothesis)

contains one or more motion candidates (i.e., first hypothesis) and/or one intra prediction mode (i.e., second hypothesis), where the motion candidate are selected from a Candidate List I and/or the intra prediction mode is selected from a Candidate List II. For MH mode for intra, each Multi-hypothesis candidate (or each candidate with Multi-hypothesis) contains one motion candidate and one Intra prediction mode, where the motion candidate is selected from Candidate List I and the intra prediction mode is fixed to be one mode (e.g. planar) or selected from Candidate List II. MH mode for Inter uses two motion candidates, and at least one of the two motion candidates is derived from Candidate List I. In some embodiments, Candidate List I is identical to the Merge candidates list of the current block and that both motion candidates of a Multi-hypothesis candidate of MH mode for inter are selected from Candidate List I. In some embodiments, the Candidate List I is a subset of the Merge candidate list. In some embodiments, for MH mode for inter, each of the two motions used to generate the prediction for each prediction unit is indicated with a signaled index. When the index refers to a bi-prediction motion candidate in Candidate List I, the motion for list-0 or list-1 is chosen according to the index. When the index refers to a uni-prediction motion candidate in Candidate List I, the uni-prediction motion is used.

Figure 11A:
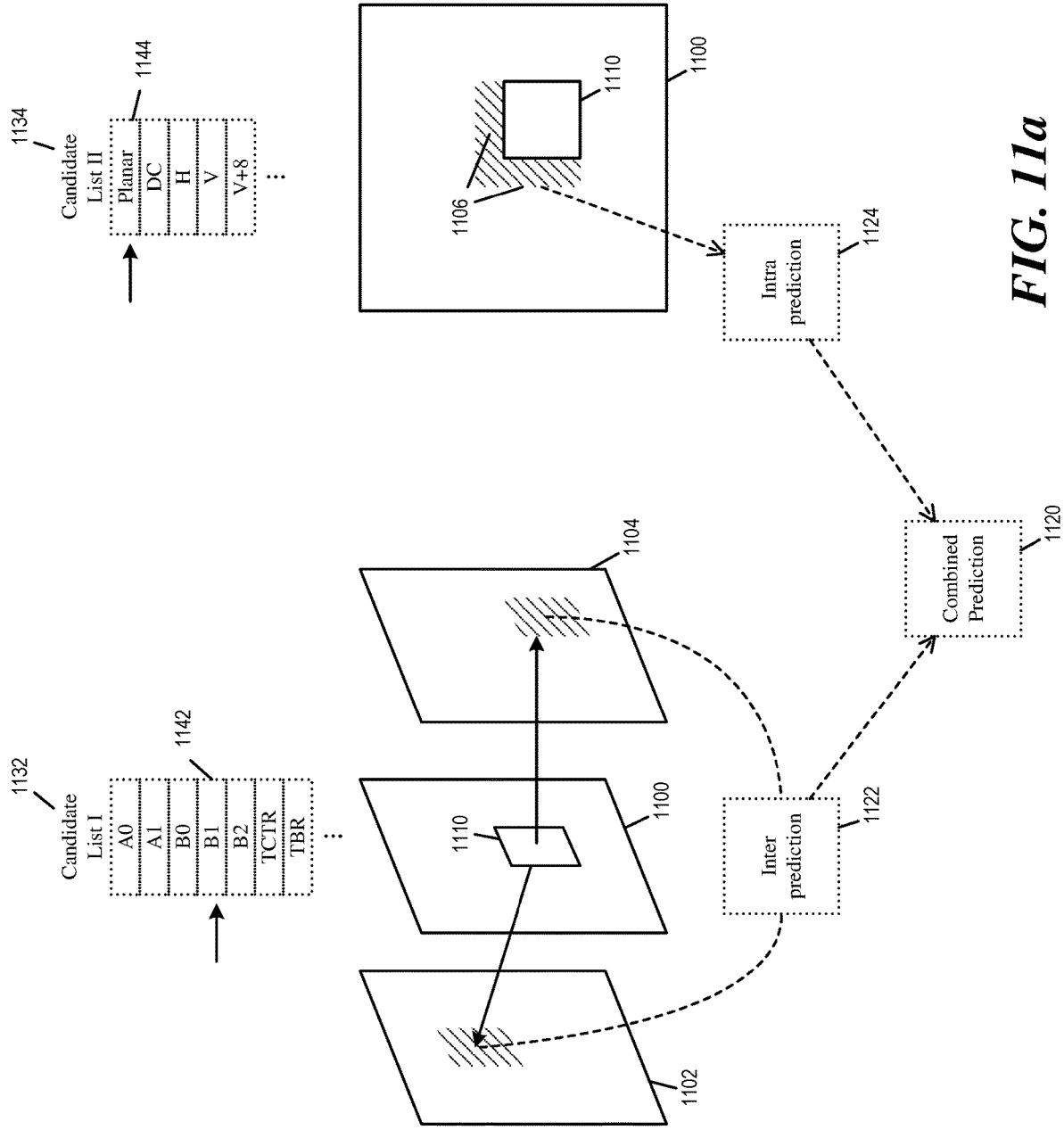
FIG. 11a conceptually illustrate encoding or decoding a block of pixels by using MH Mode for Intra.

FIG. 11a conceptually illustrate encoding or decoding a block of pixels by using MH Mode for Intra (e.g., CIIP). The figure illustrates a video picture 1100 that is currently being encoded or decoded by a video coder. The video picture 1100 includes a block of pixels 1110 that is currently being encoded or decoded as a current block. The current block 1110 is coded by MH mode for intra, specifically, a combined prediction 1120 is generated based on a first prediction 1122 (first hypothesis) of the current block 1110 and a second prediction 1124 (second hypothesis) of the current block 1110. The combined prediction 1120 is then used to reconstruct the current block 1110.

The current block 1110 being coded by using MH mode for Intra. Specifically, the first prediction is obtained by inter-prediction based on at least one of reference frames 1102 and 1104. The second prediction 1124 is obtained by intra-prediction based on neighboring pixels 1106 of the current block 1110. As illustrated, the first prediction 1122 is generated based on an inter-prediction mode or a motion candidate 1142 that is selected from a first candidate list 1132 (Candidate List I) comprising one or more candidate inter-prediction modes. The candidate list I can be the Merge candidate list of the current block 1110. The second prediction 1124 is generated based on an intra-prediction mode 1144 that is pre-defined as one intra prediction mode (e.g. planar) or selected from a second candidate list 1134 (Candidate List II) comprising one or more candidate intra-prediction modes. If only one intra prediction mode (e.g. planar) is used for MH for intra, the intra prediction mode for MH for intra is set as that intra prediction mode without signaling.

Figure 11B:
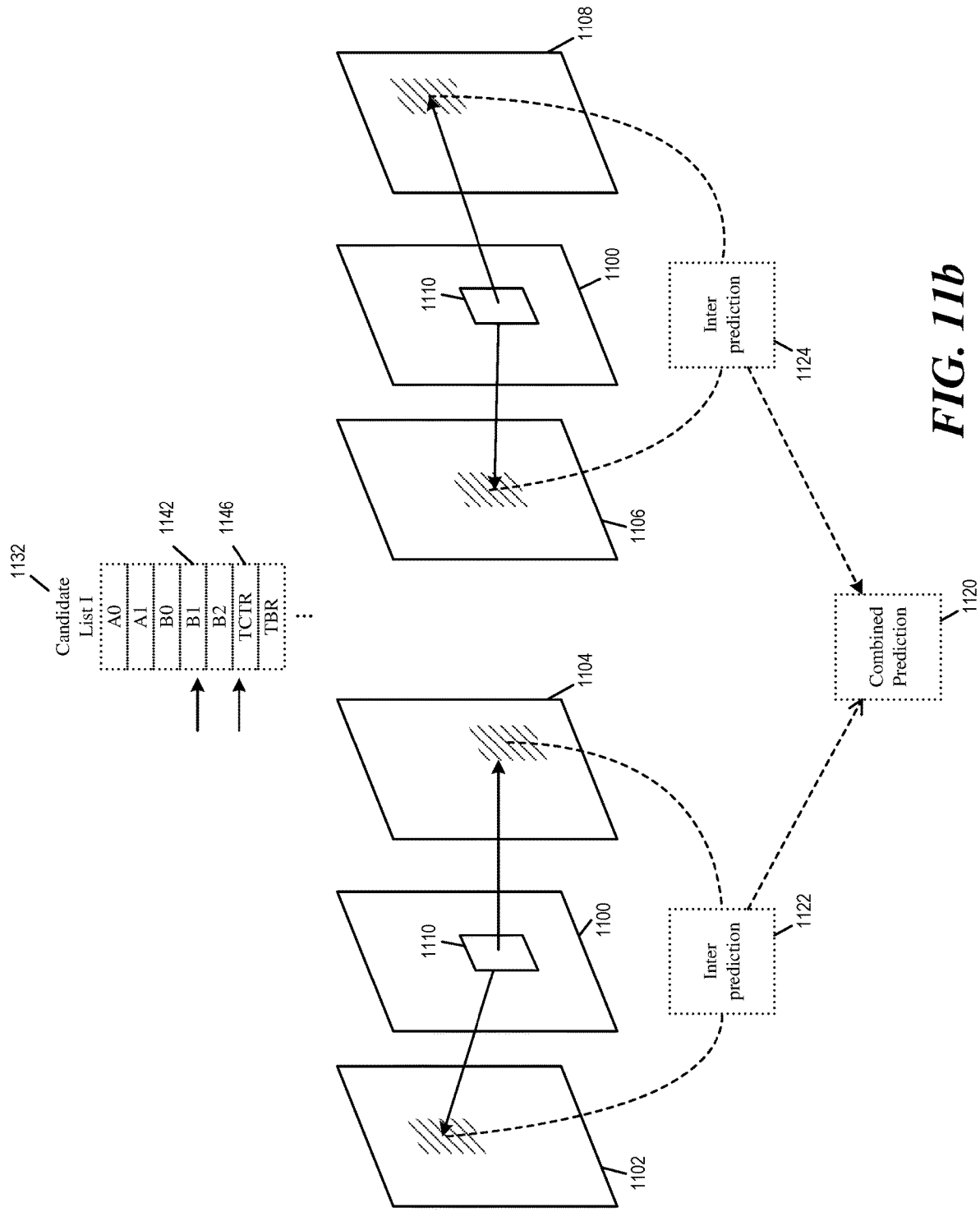
FIG. 11b illustrates the current block being coded by using MH mode for Inter.

FIG. 11b illustrates the current block 1110 being coded by using MH mode for Inter. Specifically, the first prediction 1122 is obtained by inter-prediction based on at least one of reference frames 1102 and 1104. The second prediction 1124 is obtained by inter-prediction based on at least one of reference frames 1106 and 1108. As illustrated, the first prediction 1122 is generated based on an inter-prediction mode or a motion candidate 1142 (first prediction mode) that is selected from the first candidate list 1132 (Candidate List I). The second prediction 1124 is generated based on an inter-prediction mode or a motion candidate 1146 that is also selected from the first candidate list 1132 (Candidate List I). The candidate list I can be the Merge candidate list of the current block.

In some embodiments, when MH mode for Intra is supported, one flag is signaled (for example, to represent whether MH mode for Intra is applied) in addition to the original syntax for merge mode. Such a flag may be represented or indicated by a syntax element in a bitstream. In some embodiment, if the flag is on, one additional Intra mode index is signaled to indicate the Intra prediction mode from Candidate List II. In some embodiment, if the flag is on, the intra prediction mode for MH mode for intra (e.g., CIIP, or any one of MH modes for intra) is implicitly selected from Candidate List II or implicitly assigned with one intra prediction mode without one additional Intra mode index. In some embodiments, when the flag is off, MH mode for inter (e.g. TPM, or any one of other MH modes for inter which has different shapes of prediction units) can be used.

In some embodiments, the video codec (video encoder or video decoder) removes all bi-prediction case in CIIP. That is, the video codec activates CIIP only when the current merge candidate is uni-prediction. In some embodiments, the video codec removes all bi-prediction candidates for merge candidates for CIIP. In some embodiments, the video codec retrieves L0 information of one bi-prediction (merge candidate) and changing it into a uni-prediction candidate and for CIIP. In some embodiment, the video codec retrieves L1 information of one bi-prediction (merge candidate) and changing it into a uni-prediction candidate for CIIP. By removing all bi-prediction behavior of CIIP, related syntax elements can be saved or omitted from transmission.

In some embodiments, when generating an inter prediction for CIIP mode, a motion candidate with bi-prediction is turned into uni-prediction according to one predefined rule. In some embodiments, the predefined rule specifies or chooses List-0 or List-1 motion vector depending on the POC distance. When the distance, denoted as $D_1$, between the current POC (or the POC of the current picture) and the POC (of the reference picture) referred by List-x motion vector, where x is 0 or 1, is smaller than the distance, denoted as $D_2$, between the current POC and the POC referred by List-y motion vector, where y is 0 or 1 and y is not equal to be x, List-x motion vector is selected to generate the inter prediction for CIIP. If $D_1$ is the same as $D_2$ or the difference of $D_1$ and $D_2$ is smaller than a threshold, List-x motion vector, where x is predefined to be 0 or 1, is selected to generate the inter prediction for CIIP. In some other embodiment, the predefined rule is to always choose List-x motion vector, where x is predefined to be 0 or 1. In some other embodiment, this bi-to-uni prediction scheme can be applied to motion compensation to generate the prediction. When the motion information for the current-coded CIIP CU is saved for referencing by the following or subsequent CUs, the motion information before applying this bi-to-uni prediction scheme is used. In some embodiment, this bi-to-uni prediction scheme is applied after generating the merge candidate list for CIIP. Processes such as motion compensation and/or motion information saving and/or de-blocking may use the generated uni-prediction motion information.

In some embodiments, a new candidate list formed by uni-prediction motion candidates is built for CIIP. In some embodiment, this candidate list can be generated from the merge candidate list for regular merge mode according to a predefined rule. For example, the predefined rule may specify that the bi-prediction motion candidates be ignored when generating the candidate list like what regular merge mode does. The length of this new candidate list for CIIP can be equal to or less than that for regular merge mode. For another example, the predefined rule may specify that the candidate list for CIIP re-uses the candidate list for TPM or that the candidate list for CIIP be re-used for TPM. The above-proposed methods can be combined with an implicit rule or an explicit rule. The implicit rule may depend on the block width or height or area and the explicit rule can be signaling a flag at CU, CTU, slice, tile, tile group, picture, SPS, PPS level, or etc.

In some embodiments, CIIP and TPM are classified into a group for combined prediction modes and the syntax for CIIP and TPM is also unified instead of using two separate flags to decide whether to use CIIP and whether to use TPM. The unification scheme is according to the following: When the enabling conditions for the group for combined prediction modes (For example, the union set of the enabling conditions for CIIP and TPM, including high-level syntax, size constraint, supported modes, or slice type, are satisfied, CIIP or TPM can be enabled or disabled with the unified syntax. First, a first bin is signaled (or a first flag is signaled using the first bin) to indicate whether the multi-hypothesis prediction mode is applied. Second, if the first flag indicates that multi-hypothesis prediction mode is applied, a second bin is signaled (or a second flag is signaled using the second bin) to indicate one of CIIP and TPM is applied. For example, when the first bin (or the first flag) is equal to 0, non-multi-hypothesis prediction mode such as regular merge mode is applied; otherwise, multi-hypothesis prediction mode such as CIIP or TPM is applied. When the first bin (or the first flag) indicates that multi-hypothesis prediction mode is applied (regular_merge_flag equal to 0), the second flag is signaled. When the second bin (or the second flag) is equal to 0, TPM is applied and additional syntax for TPM may be required (e.g. the additional syntax for TPM is to indicate the two motion candidates for TPM or the partitioning direction of TPM). When the second bin (or the second flag) is equal to 1, CIIP is applied and additional syntax for CIIP may be required (e.g. the additional syntax for CIIP is to indicate the two candidates for CIIP). An example of enabling conditions for the group for combined prediction modes include (1) The high level syntax CIIP and (2) TPM is turned on.

XIV. Signaling for LIC

In some embodiments, all bi-prediction cases are removed for LIC mode. In some embodiment, LIC is allowed only when the current merge candidate is uni-prediction. In some embodiments, the video codec retrieves L0 information of one bi-prediction (candidate), changes the current merge candidate into uni-prediction candidate, and then apply LIC. In some embodiments, the video codec retrieves L1 information of one bi-prediction (candidate), changes it to uni-prediction candidate, and then apply LIC.

In some embodiments, when generating the inter prediction for LIC mode, the motion candidate with bi-prediction is turned into uni-prediction according to a predefined rule. In some embodiments, the predefined rule specifies or chooses List-0 or List-1 motion vector depending on the POC distance. When the distance, denoted as $D_1$, between the current POC (the POC of the current picture) and the POC (of the reference picture) referred by List-x motion vector, where x is 0 or 1, is smaller than the distance, denoted as $D_2$, between the current POC and the POC referred by List-y motion vector, where y is 0 or 1 and y is not equal to be x, then List-x motion vector is selected for refining the inter prediction by applying LIC. If $D_1$ is the same as $D_2$ or the difference of $D_1$ and $D_2$ is smaller than a threshold, List-x motion vector, where x is predefined to be 0 or 1, is then selected for refining the inter prediction by using LIC. In some embodiments, the predefined rule specifies or chooses List-x motion vector, where x is predefined to be 0 or 1. In some embodiments, this bi-to-uni prediction scheme can be applied to only motion compensation to generate the prediction. When the motion information for the current-coded LIC CU is saved for referencing by the following or subsequent CUs, the motion information before applying this bi-to-uni prediction scheme is used. In some embodiments, this bi-to-uni prediction scheme is applied after generating the merge candidate list for LIC. Processes such as motion compensation and/or motion information saving use the generated uni-prediction motion information.

In some embodiments, a new candidate list, formed by uni-prediction motion candidates, is built for LIC. In some embodiments, this candidate list can be generated from the merge candidate list for regular merge mode according to a predefined rule. For example, the predefined rule may directly ignore the bi-prediction motion candidates during generating the candidate list like what regular merge mode does. The length of this new candidate list for LIC can be equal to or less than that for regular merge mode.

In some embodiments, in merge mode, the criterion to enable LIC does not only depend on the LIC flag of merge candidate, but also can depend on the number of neighboring merge candidates using LIC or historical statistics. For example, if the number of candidates in the merge list using LIC is larger than a predefined threshold, then LIC is enabled for the current block no matter the LIC flag of the merged candidate is on or off. For another example, a historical FIFO buffer recorded the LIC mode usage of recent coded blocks, suppose the size of record in the historical FIFO buffer is M, if N out of M use LIC mode, then LIC is enabled for the current block. Besides, this embodiment can also be combined with the aforementioned bi-to-uni prediction scheme for LIC, that is, if the LIC flag of current block is enabled due to the number of neighboring merge candidates using LIC is larger than a threshold or N out of M records in historical FIFO buffer use LIC mode, and the merged candidate uses bi-prediction, then List-x motion vector is selected, where x is predefined to be 0 or 1.

All combinations of above can be decided with an implicit rule or an explicit rule. The implicit rule may depend on the block width, height, area, block size aspect ratio, color component, or picture type. The explicit rule can be signaled by a flag at CU, CTU, slice, tile, tile group, picture, SPS, PPS level, or etc.

XV. Example Video Encoder

Figure 12:
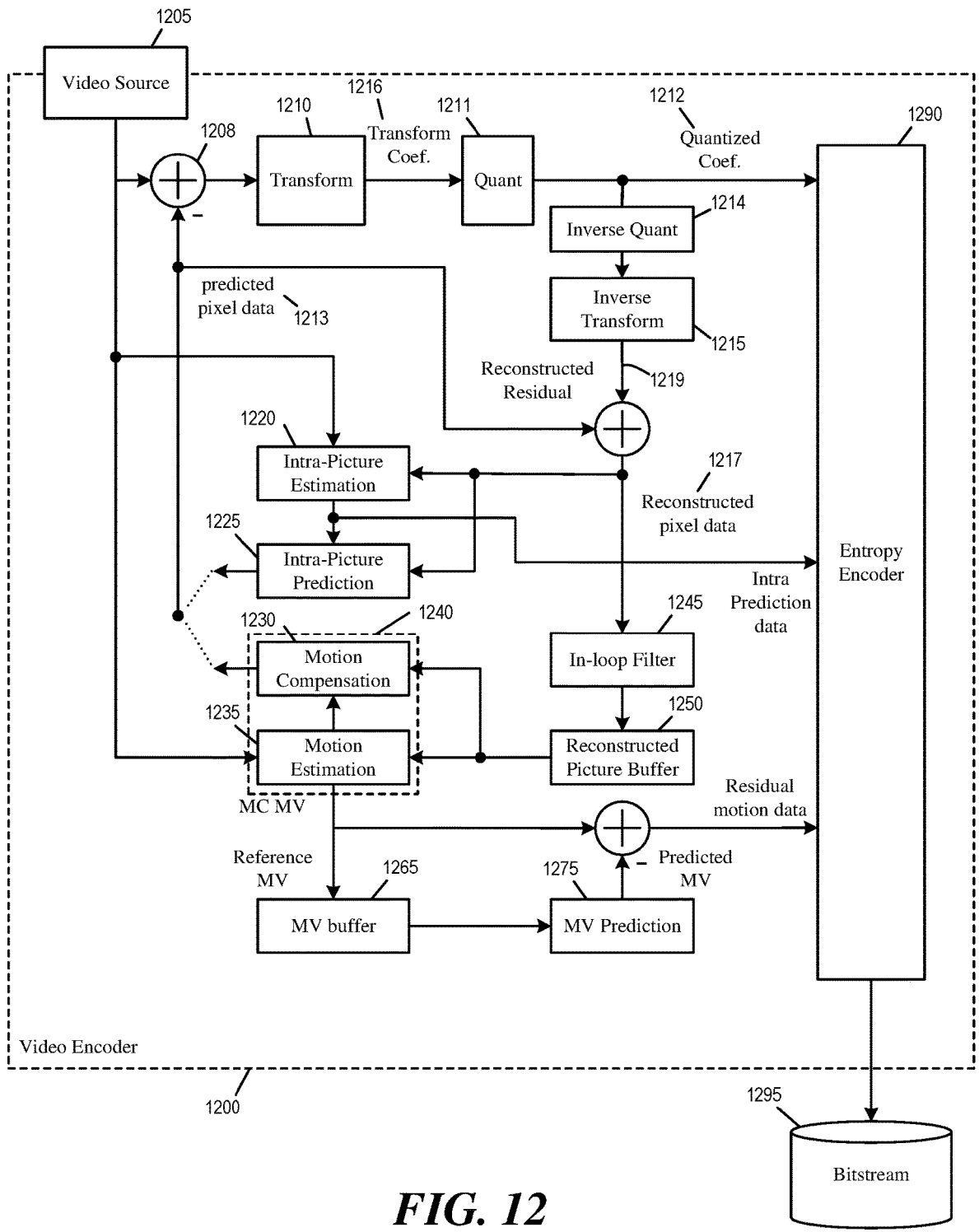
FIG. 12 illustrates an example video encoder that may implement mutual excluding grouping of coding modes or tools.

FIG. 12 illustrates an example video encoder 1200 that may implement mutual excluding grouping of coding modes or tools. As illustrated, the video encoder 1200 receives input video signal from a video source 1205 and encodes the signal into bitstream 1295. The video encoder 1200 has several components or modules for encoding the signal from the video source 1205, at least including some components selected from a transform module 1210, a quantization module 1211, an inverse quantization module 1214, an inverse transform module 1215, an intra-picture estimation module 1220, an intra-prediction module 1225, a motion compensation module 1230, a motion estimation module 1235, an in-loop filter 1245, a reconstructed picture buffer 1250, a MV buffer 1265, and a MV prediction module 1275, and an entropy encoder 1290. The motion compensation module 1230 and the motion estimation module 1235 are part of an inter-prediction module 1240.

In some embodiments, the modules 1210-1290 are modules of software instructions being executed by one or more processing units (e.g., a processor) of a computing device or electronic apparatus. In some embodiments, the modules 1210-1290 are modules of hardware circuits implemented by one or more integrated circuits (ICs) of an electronic apparatus. Though the modules 1210-1290 are illustrated as being separate modules, some of the modules can be combined into a single module.

The video source 1205 provides a raw video signal that presents pixel data of each video frame without compression. A subtractor 1208 computes the difference between the raw video pixel data of the video source 1205 and the predicted pixel data 1213 from the motion compensation module 1230 or intra-prediction module 1225. The transform module 1210 converts the difference (or the residual pixel data or residual signal 1209) into transform coefficients (e.g., by performing Discrete Cosine Transform, or DCT). The quantization module 1211 quantizes the transform coefficients into quantized data (or quantized coefficients) 1212, which is encoded into the bitstream 1295 by the entropy encoder 1290.

The inverse quantization module 1214 de-quantizes the quantized data (or quantized coefficients) 1212 to obtain transform coefficients, and the inverse transform module 1215 performs inverse transform on the transform coefficients to produce reconstructed residual 1219. The reconstructed residual 1219 is added with the predicted pixel data 1213 to produce reconstructed pixel data 1217. In some embodiments, the reconstructed pixel data 1217 is temporarily stored in a line buffer (not illustrated) for intra-picture prediction and spatial MV prediction. The reconstructed pixels are filtered by the in-loop filter 1245 and stored in the reconstructed picture buffer 1250. In some embodiments, the reconstructed picture buffer 1250 is a storage external to the video encoder 1200. In some embodiments, the reconstructed picture buffer 1250 is a storage internal to the video encoder 1200.

The intra-picture estimation module 1220 performs intra-prediction based on the reconstructed pixel data 1217 to produce intra prediction data. The intra-prediction data is provided to the entropy encoder 1290 to be encoded into bitstream 1295. The intra-prediction data is also used by the intra-prediction module 1225 to produce the predicted pixel data 1213.

The motion estimation module 1235 performs inter-prediction by producing MVs to reference pixel data of previously decoded frames stored in the reconstructed picture buffer 1250. These MVs are provided to the motion compensation module 1230 to produce predicted pixel data.

Instead of encoding the complete actual MVs in the bitstream, the video encoder 1200 uses MV prediction to generate predicted MVs, and the difference between the MVs used for motion compensation and the predicted MVs is encoded as residual motion data and stored in the bitstream 1295.

The MV prediction module 1275 generates the predicted MVs based on reference MVs that were generated for encoding previously video frames, i.e., the motion compensation MVs that were used to perform motion compensation. The MV prediction module 1275 retrieves reference MVs from previous video frames from the MV buffer 1265. The video encoder 1200 stores the MVs generated for the current video frame in the MV buffer 1265 as reference MVs for generating predicted MVs.

The MV prediction module 1275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1295 by the entropy encoder 1290.

The entropy encoder 1290 encodes various parameters and data into the bitstream 1295 by using entropy-coding techniques such as context-adaptive binary arithmetic coding (CABAC) or Huffman encoding. The entropy encoder 1290 encodes various header elements, flags, along with the quantized transform coefficients 1212, and the residual motion data as syntax elements into the bitstream 1295. The bitstream 1295 is in turn stored in a storage device or transmitted to a decoder over a communications medium such as a network.

The in-loop filter 1245 performs filtering or smoothing operations on the reconstructed pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
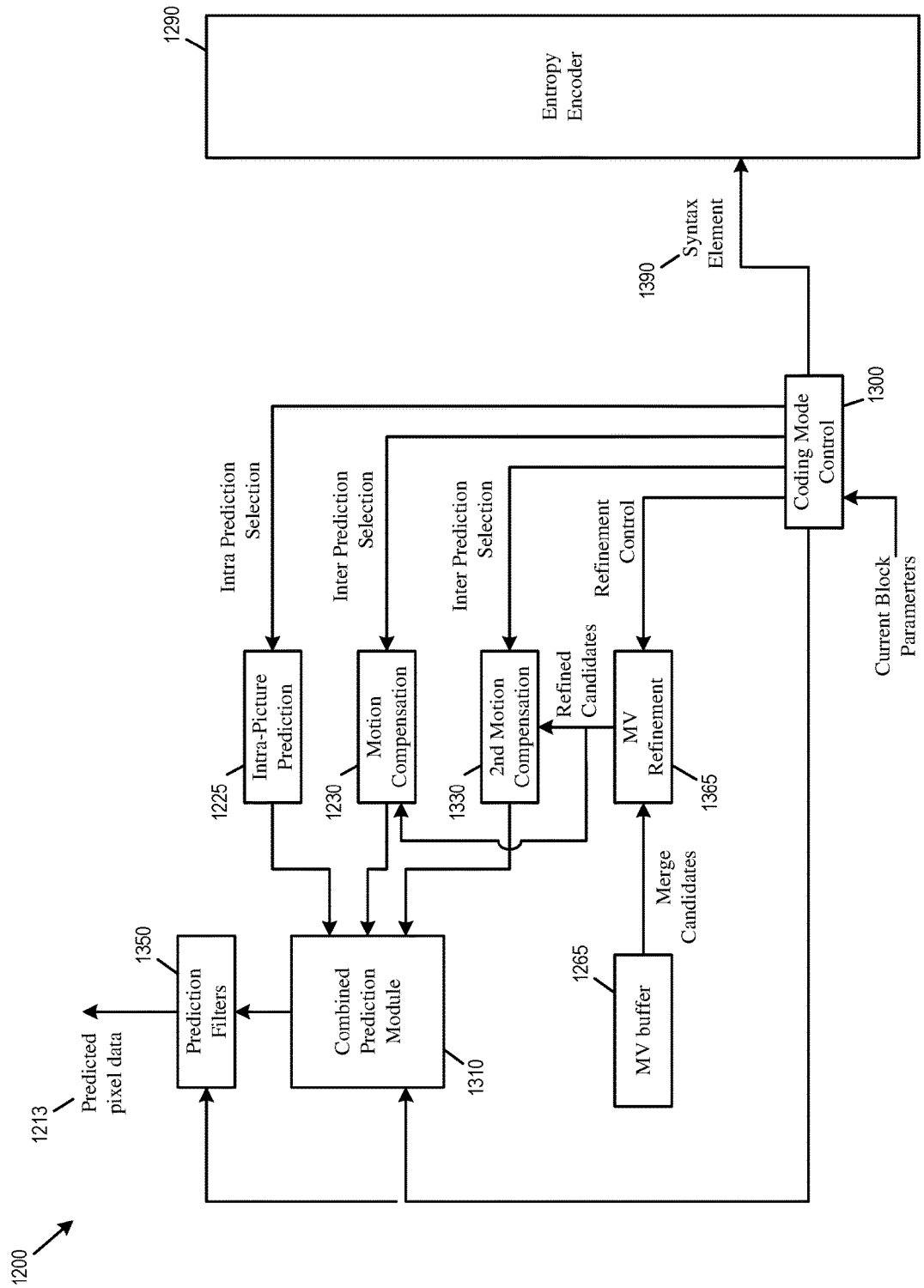
FIG. 13 illustrates portions of the video encoder that implement mutual excluding groupings of coding modes or tools.

FIG. 13 illustrates portions of the video encoder 1200 that implement mutual excluding groupings of coding modes or tools. As illustrated, the video encoder 1200 implements a combined prediction module 1310 that may receive intra-prediction values generated by the intra-picture prediction module 1225. The combined prediction module 1310 may also receive inter-prediction values from the motion compensation module 1230, as well as a second motion compensation module 1330. The combined prediction module 1310 in turn generates the predicted pixel data 1213, which may be further filtered by a set of prediction filters 1350.

The MV buffer 1265 provides the merge candidates to the motion compensation modules 1230 and 1330. The MV buffer 1265 also stores the motion information and the mode directions used to encode the current block for use by subsequent blocks. The merge candidates may be altered, expanded, and/or refined by a MV refinement module 1365.

A coding mode (or tool) control module 1300 controls the operations of the intra-picture prediction module 1225, the motion compensation module 1230, the second motion compensation module 1330, the MV refinement module 1365, the combined prediction module 1310, and the prediction filters 1350.

The coding mode control 1300 may enable the MV refinement module 1365 to perform MV refinement operations by searching for a refined MV (e.g., for DMVR) or computing a gradient based MV adjustment (e.g., for BDOF). The coding mode control module 1300 may enable the intra-prediction module 1225 and the motion compensation module 1230 to implement MH mode Intra (or Inter-Intra) mode (e.g., CIIP). The coding mode control module 1300 may enable the motion compensation module 1230 and the second motion compensation module 1330 to implement MH mode Inter mode (e.g., for the diagonal edge region of TPM). The coding mode control module 1300 may enable the combined prediction module 1310 to adopt different weighting schemes when combining prediction signals from intra-picture prediction module 1225, the motion compensation module 1230, and/or the second motion compensation module 1330 in order to implement coding modes such as CIIP, TPM, GBI, and or WP. The coding mode control 1300 may also enable the prediction filters 1350 to apply LIC, DIF, BIF, and/or HAD filter on the predicted pixel data 1213 or the reconstructed pixel data 1217.

The coding mode control module 1300 also determines which coding modes to enable and/or disable for coding the current block. The coding mode control module 1300 then controls the operations of the intra-picture prediction module 1225, the motion compensation module 1230, the second motion compensation module 1330, the MV refinement module 1365, the combined prediction module 1310, and the prediction filters 1350 to enable and/or disable specific coding modes.

In some embodiments, the coding mode control 1300 enables only a subset (one or more) of the coding modes from a particular set of two or more coding modes for encoding the current block or CU. Such a particular set of coding modes may include all or any subset of the following coding modes: CIIP, TPM, BDOF, DMVR, GBI, WP, LIC, DIF, BIF, and HAD. In some embodiments, when a first condition for enabling a first coding mode for the current block is satisfied, the coding mode control 1300 disables a second coding mode for the current block.

In some embodiments, when the condition for enabling the first coding mode is satisfied and the first coding mode is enabled, the coding mode control 1300 disables all coding modes in the particular set of coding modes except the first coding mode. In some embodiments, when the first condition for enabling the first coding mode and a second condition for enabling the second coding mode for the current block are both satisfied and the first coding mode is enabled, the coding mode control 1300 disable the second coding mode. For example, in some embodiments, when the coding mode control 1300 determines that the conditions for enabling GBI and BDOF are both satisfied and the GBi index indicates unequal weights to blend the predictions for list-0 and list-1, the coding mode control 1300 would disable BDOF. For another example, in some embodiments, when the coding mode control 1300 determines that the conditions for enabling GBI and DMVR are both satisfied and the GBi index indicates unequal weights to blend the predictions for list-0 and list-1, the coding mode control 1300 would disable DMVR.

In some embodiments, the coding mode control 1300 identifies a highest priority coding mode from among the one or more coding modes. If the highest priority coding mode is enabled, the coding mode control 1300 then disables all other coding modes in the particular set of coding modes no matter the enabling conditions for each of other coding modes are satisfied or not. In some embodiments, each coding mode of the particular set of coding modes is assigned a priority according to a priority rule that is defined based on a parameter of the current block, such as the size or the aspect ratio of the current block.

The coding mode control 1300 generates or signals a syntax element 1390 to the entropy encoder 1290 to indicate that one or more of the coding modes are enabled. The video encoder 1200 may also disable one or more other coding modes in the particular set of coding modes without signaling syntax elements for the disabled one or more other coding modes. In some embodiments, a first syntax element (e.g., a first flag) is used indicate whether a multi-hypothesis prediction mode is applied and a second syntax element (e.g., a second flag) is used to indicate whether CIIP or TPM is applied. The first and second elements are correspondingly coded as a first bin and a second bin by the entropy encoder 1290. In some embodiments, the second bin for deciding between CIIP and TPM is signaled only if the first bin indicates that multi-hypothesis mode is enabled.

Figure 14:
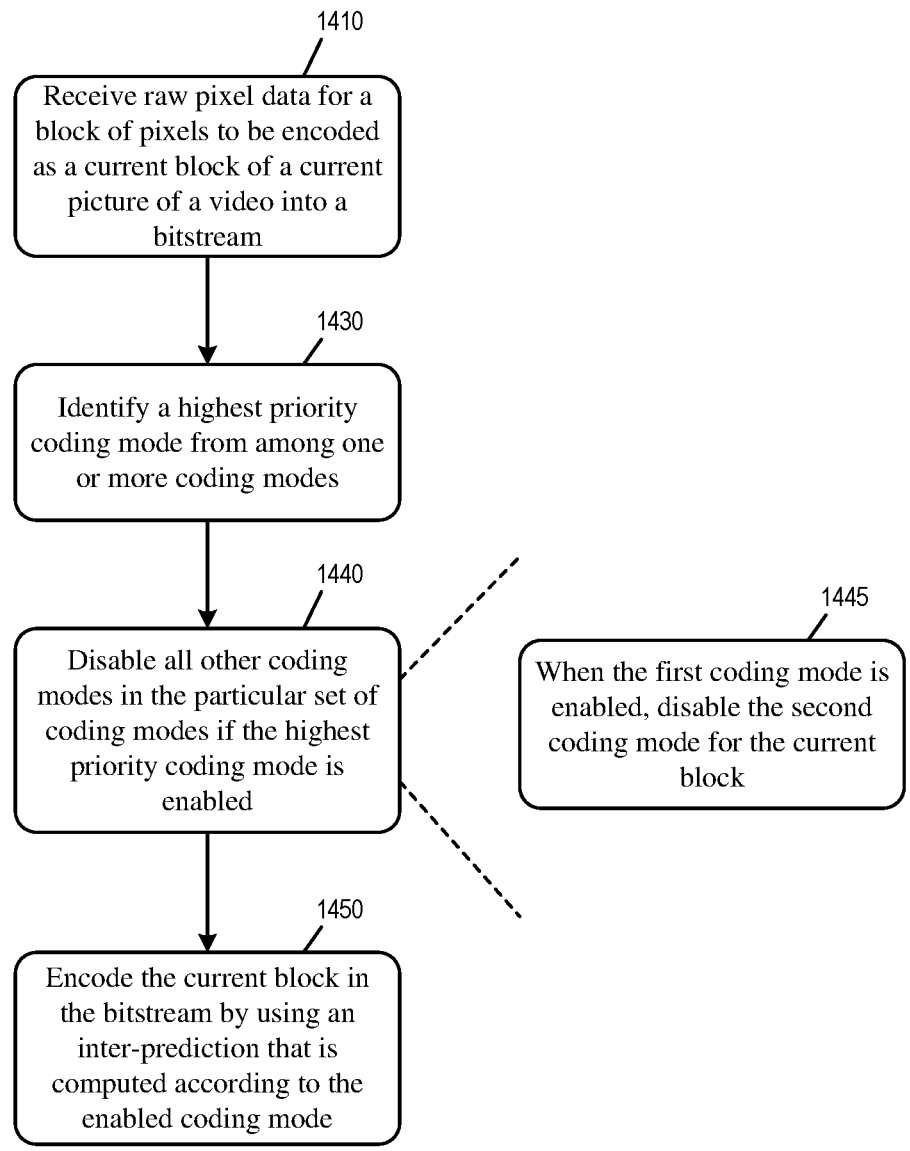
FIG. 14 conceptually illustrates a process for implementing mutual excluding grouping of coding modes or tools at a video encoder.

FIG. 14 conceptually illustrates a process 1400 for implementing mutual excluding grouping of coding modes or tools. In some embodiments, one or more processing units (e.g., a processor) of a computing device implementing the encoder 1200 performs the process 1400 by executing instructions stored in a computer readable medium. In some embodiments, an electronic apparatus implementing the encoder 1200 performs the process 1400.

The encoder receives (at block 1410) data for a block of pixels to be encoded as a current block of a current picture of a video.

The encoder identifies (at block 1430) a highest priority coding mode from among the one or more coding modes. In some embodiments, each coding mode of the particular set of coding modes is assigned a priority according to a priority rule that is defined based on a parameter of the current block.

The encoder disables (at block 1440) all other coding modes in the particular set of coding modes if the highest priority coding mode is enabled. The conditions for enabling the various coding modes are described above in Sections related to those coding modes. The condition for enabling a coding mode may include receiving an express syntax element from the bitstream for the coding mode. The condition for enabling a coding mode may also include having a particular characteristic or parameter (e.g., size, aspect ratio) for the current block being coded. For example, when the particular set of coding modes includes a first coding mode assigned a higher priority and a second coding mode assigned a lower priority, and when the first coding mode is enabled, the encoder disables (at block 1445) the second coding mode for the current block. In some embodiments, when the first coding mode is enabled, the encoder disables all coding modes in the particular set of coding modes except the first coding mode. In some embodiments, the encoder enables GBI (which means using unequal weights to blend the inter predictions from list-0 and list-1) if the GBi weight index indicates unequal weights, but disables BDOF because GBI is assigned higher priority than BDOF. For another example, in some embodiments, the encoder enables GBI (which means using unequal weights to blend the inter predictions from list-0 and list-1) if the GBi weight index indicates unequal weights, but disables DMVR, because GBI is assigned higher priority than DMVR. For another example, in some embodiments, the encoder enables CIIP if CIIP flag is equal to 1, but disables GBi, BDOF, and/or DMVR, because CIIP is assigned higher priority than the disabled tools.

The encoder encodes (at block 1450) the current block in the bitstream by using an inter-prediction that is computed according to the enabled coding mode.

XVI. Example Video Decoder

Figure 15:
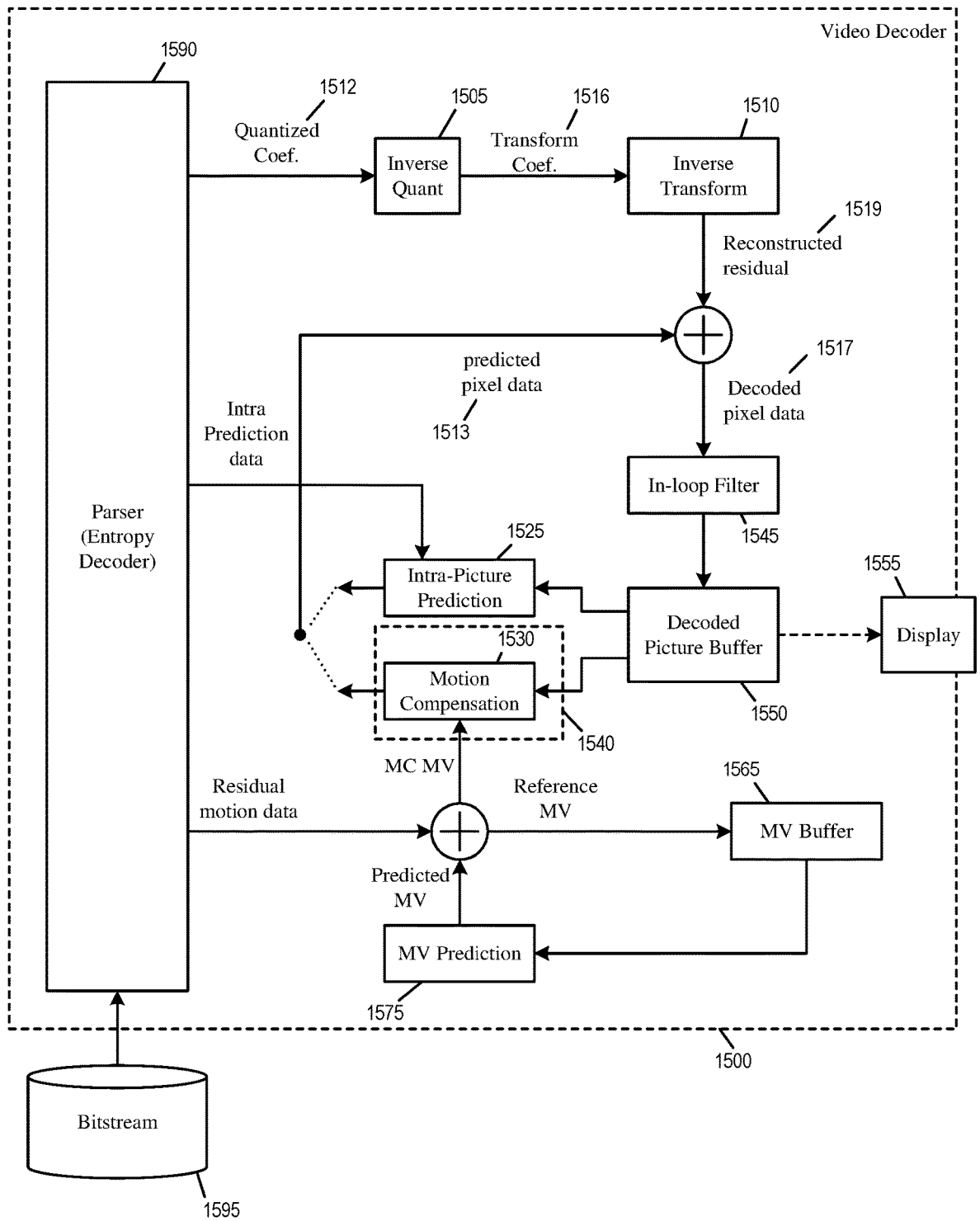
FIG. 15 illustrates an example video decoder that may implement mutual excluding grouping of coding modes or tools.

FIG. 15 illustrates an example video decoder 1500 that may implement mutual excluding grouping of coding modes or tools. As illustrated, the video decoder 1500 is an image-decoding or video-decoding circuit that receives a bitstream 1595 and decodes the content of the bitstream into pixel data of video frames for display. The video decoder 1500 has several components or modules for decoding the bitstream 1595, including some components selected from an inverse quantization module 1505, an inverse transform module 1510, an intra-prediction module 1525, a motion compensation module 1530, an in-loop filter 1545, a decoded picture buffer 1550, a MV buffer 1565, a MV prediction module 1575, and a parser 1590. The motion compensation module 1530 is part of an inter-prediction module 1540.

In some embodiments, the modules 1510-1590 are modules of software instructions being executed by one or more processing units (e.g., a processor) of a computing device. In some embodiments, the modules 1510-1590 are modules of hardware circuits implemented by one or more ICs of an electronic apparatus. Though the modules 1510-1590 are illustrated as being separate modules, some of the modules can be combined into a single module.

The parser 1590 (or entropy decoder) receives the bitstream 1595 and performs initial parsing according to the syntax defined by a video-coding or image-coding standard. The parsed syntax element includes various header elements, flags, as well as quantized data (or quantized coefficients) 1512. The parser 1590 parses out the various syntax elements by using entropy-coding techniques such as context-adaptive binary arithmetic coding (CABAC) or Huffman encoding.

The inverse quantization module 1505 de-quantizes the quantized data (or quantized coefficients) 1512 to obtain transform coefficients, and the inverse transform module 1510 performs inverse transform on the transform coefficients 1516 to produce reconstructed residual signal 1519. The reconstructed residual signal 1519 is added with predicted pixel data 1513 from the intra-prediction module 1525 or the motion compensation module 1530 to produce decoded pixel data 1517. The decoded pixels data are filtered by the in-loop filter 1545 and stored in the decoded picture buffer 1550. In some embodiments, the decoded picture buffer 1550 is a storage external to the video decoder 1500. In some embodiments, the decoded picture buffer 1550 is a storage internal to the video decoder 1500.

The intra-prediction module 1525 receives intra-prediction data from bitstream 1595 and according to which, produces the predicted pixel data 1513 from the decoded pixel data 1517 stored in the decoded picture buffer 1550. In some embodiments, the decoded pixel data 1517 is also stored in a line buffer (not illustrated) for intra-picture prediction and spatial MV prediction.

In some embodiments, the content of the decoded picture buffer 1550 is used for display. A display device 1555 either retrieves the content of the decoded picture buffer 1550 for display directly or retrieves the content of the decoded picture buffer to a display buffer. In some embodiments, the display device receives pixel values from the decoded picture buffer 1550 through a pixel transport.

The motion compensation module 1530 produces predicted pixel data 1513 from the decoded pixel data 1517 stored in the decoded picture buffer 1550 according to motion compensation MVs (MC MVs). These motion compensation MVs are decoded by adding the residual motion data received from the bitstream 1595 with predicted MVs received from the MV prediction module 1575.

The MV prediction module 1575 generates the predicted MVs based on reference MVs that were generated for decoding previous video frames, e.g., the motion compensation MVs that were used to perform motion compensation. The MV prediction module 1575 retrieves the reference MVs of previous video frames from the MV buffer 1565. The video decoder 1500 stores the motion compensation MVs generated for decoding the current video frame in the MV buffer 1565 as reference MVs for producing predicted MVs.

The in-loop filter 1545 performs filtering or smoothing operations on the decoded pixel data 1517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 16:
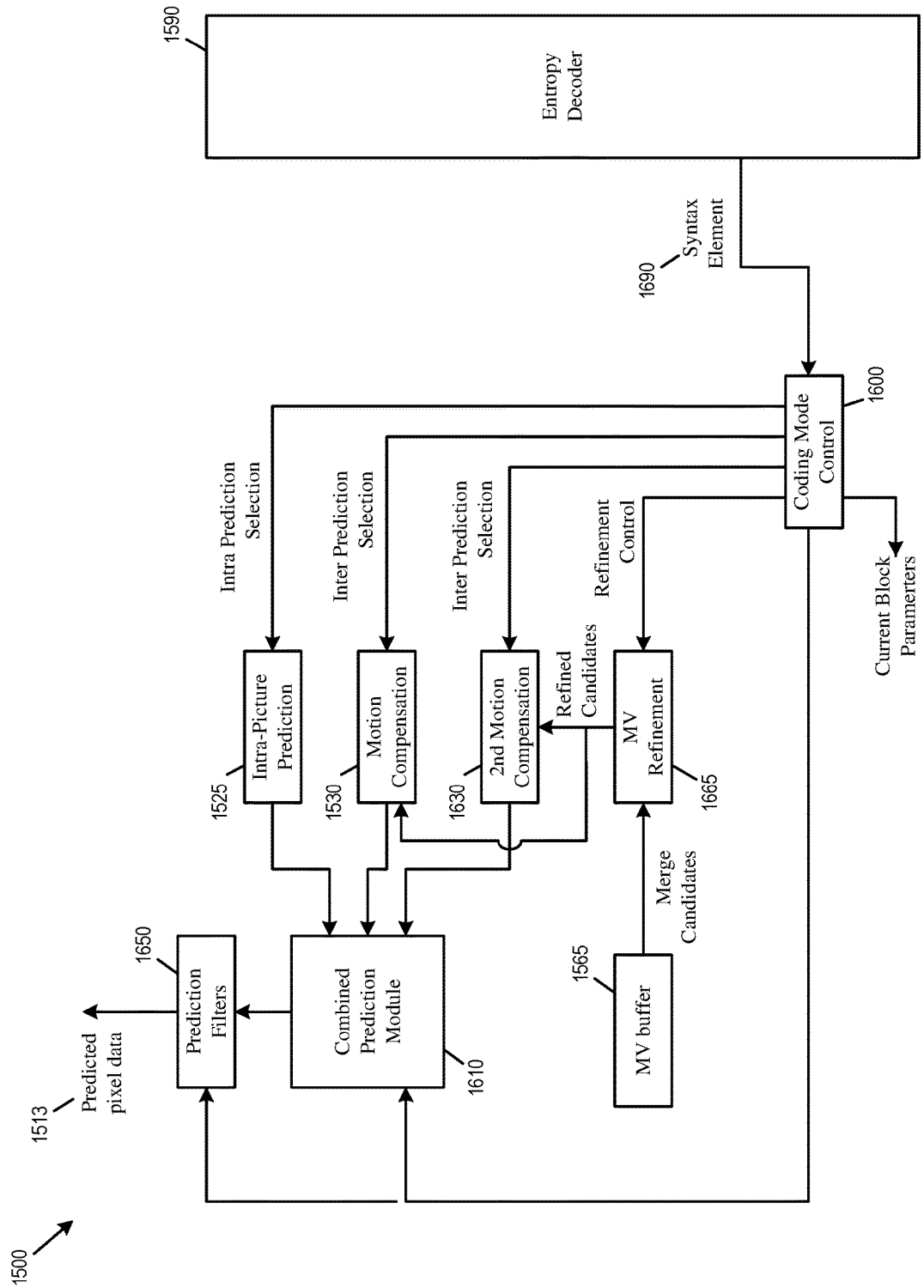
FIG. 16 illustrates portions of the video decoder that implement mutual excluding groupings of coding modes or tools.

FIG. 16 illustrates portions of the video decoder 1500 that implement mutual excluding groupings of coding modes or tools. As illustrated, the video decoder 1500 implements a combined prediction module 1610 that may receive intra-prediction values generated by the intra-picture prediction module 1525. The combined prediction module 1610 may also receive inter-prediction values from the motion compensation module 1530, as well as a second motion compensation module 1630. The combined prediction module 1610 in turn generates the predicted pixel data 1513, which may be further filtered by a set of prediction filters 1650.

The MV buffer 1565 provides the merge candidates to the motion compensation modules 1530 and 1630. The MV buffer 1565 also stores the motion information and the mode directions used to decode the current block for use by subsequent blocks. The merge candidates may be altered, expanded, and/or refined by a MV refinement module 1665.

A coding mode (or tool) control module 1600 controls the operations of the intra-picture prediction module 1525, the motion compensation module 1530, the second motion compensation module 1630, the MV refinement module 1665, the combined prediction module 1610, and the prediction filters 1650.

The coding mode control 1600 may enable the MV refinement module 1665 to perform MV refinement operations by searching for a refined MV (e.g., for DMVR) or computing a gradient based MV adjustment (e.g., for BDOF). The coding mode control module 1600 may enable the intra-prediction module 1525 and the motion compensation module 1530 to implement MH mode Intra (or Inter-Intra) mode (e.g., CIIP). The coding mode control module 1600 may enable the motion compensation module 1530 and the second motion compensation module 1630 to implement MH mode Inter mode (e.g., for the diagonal edge region of TPM). The coding mode control module 1600 may enable the combined prediction module 1610 to adopt different weighting schemes when combining prediction signals from intra-picture prediction module 1525, the motion compensation module 1530, and/or the second motion compensation module 1630 in order to implement coding modes such as CIIP, TPM, GBI, and/or WP. The coding mode control 1600 may also enable the prediction filters 1650 to apply LIC, DIF, BIF, and/or HAD filter on the predicted pixel data 1513 or the decoded pixel data 1517.

The coding mode control module 1600 also determines which coding modes to enable and/or disable for coding the current block. The coding mode control module 1600 then controls the operations of the intra-picture prediction module 1525, the motion compensation module 1530, the second motion compensation module 1630, the MV refinement module 1665, the combined prediction module 1610, and the prediction filters 1650 to enable and/or disable specific coding modes.

In some embodiments, the coding mode control 1600 enables only a subset (one or more) of the coding modes from a particular set of two or more coding modes for coding the current block or CU. Such a particular set of coding modes may include all or any subset of the following coding modes: CIIP, TPM, BDOF, DMVR, GBI, WP, LIC, DIF, BIF, and HAD. In some embodiments, when a first condition for enabling a first coding mode for the current block is satisfied, the coding mode control 1600 disables a second coding mode for the current block.

In some embodiments, when the condition for enabling the first coding mode is satisfied and the first coding mode is enabled, the coding mode control 1600 disables all coding modes in the particular set of coding modes except the first coding mode. In some embodiments, when the first condition for enabling the first coding mode and a second condition for enabling the second coding mode for the current block are both satisfied and the first coding mode is enabled, the coding mode control 1600 disable the second coding mode. For example, in some embodiments, when the coding mode control 1600 determines that the conditions for enabling GBI and BDOF are both satisfied and the GBi index indicates unequal weights to blend the predictions for list-0 and list-1, the coding mode control 1600 would disable BDOF. For another example, in some embodiments, when the coding mode control 1600 determines that the conditions for enabling GBI and DMVR are both satisfied and the GBi index indicates unequal weights to blend the predictions for list-0 and list-1, the coding mode control 1600 would disable DMVR.

In some embodiments, the coding mode control 1600 identifies a highest priority coding mode from among the one or more coding modes. If the highest priority coding mode is enabled, the coding mode control 1600 then disables all other coding modes in the particular set of coding modes no matter the enabling conditions for each of other coding modes are satisfied or not. In some embodiments, each coding mode of the particular set of coding modes is assigned a priority according to a priority rule that is defined based on a parameter of the current block, such as the size or the aspect ratio of the current block.

The coding mode control 1600 receivers a syntax element 1690 from the entropy decoder 1590 to indicate that one or more than one of the coding modes are enabled. The video decoder 1500 may also disable one or more other coding modes in the particular set of coding modes without receiving syntax elements for the disabled one or more other coding modes. In some embodiments, a first syntax element (e.g., a first flag) is used indicate whether a multi-hypothesis prediction mode is applied and a second syntax element (e.g., a second flag) is used to indicate whether CIIP or TPM is applied. The first and second elements are correspondingly decoded from a first bin and a second bin in the bitstream 1595. In some embodiments, the second bin for deciding between CIIP and TPM is signaled only if the first bin indicates that multi-hypothesis mode is enabled.

Figure 17:
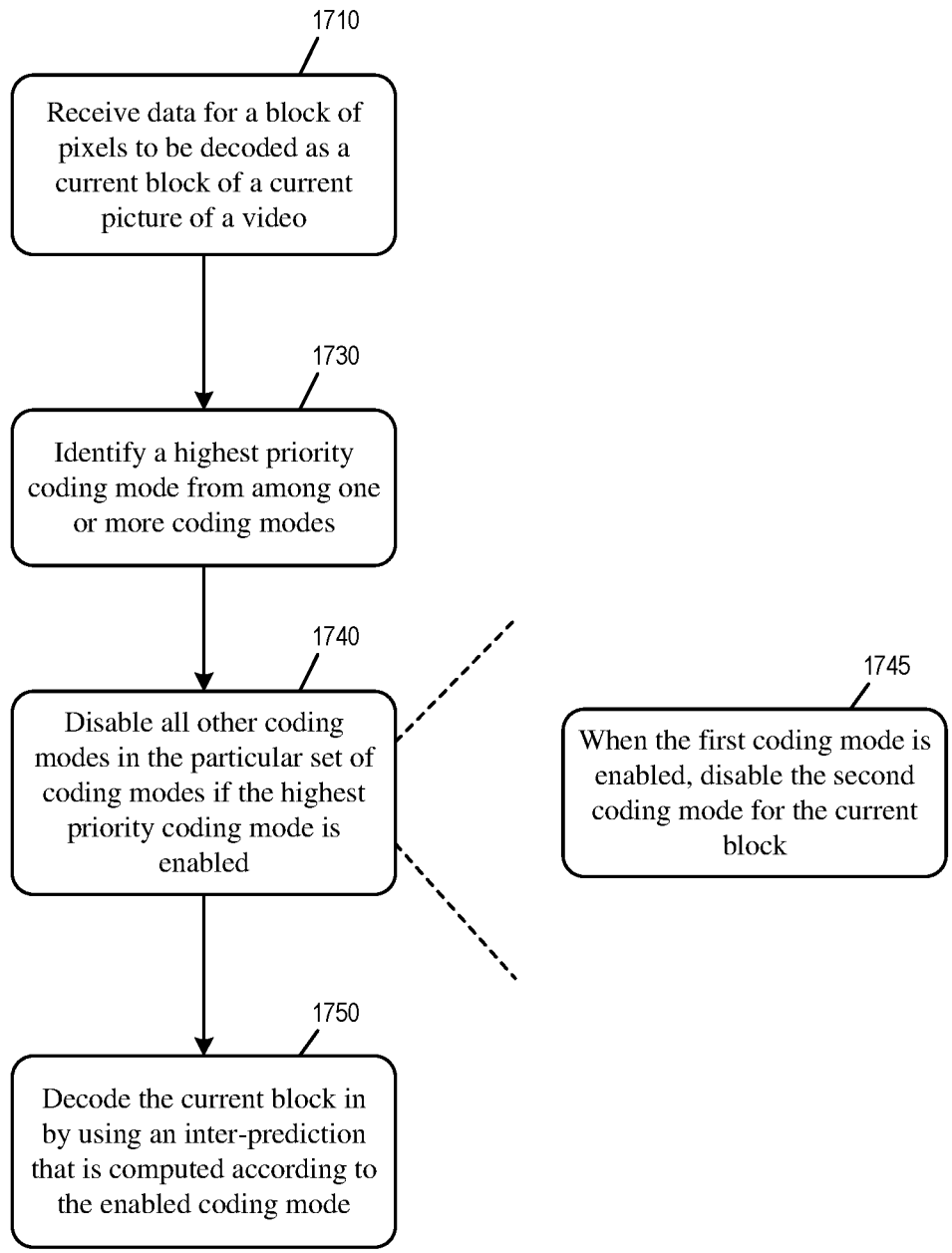
FIG. 17 conceptually illustrates a process for implementing mutual excluding grouping of coding modes or tools at a video decoder.

FIG. 17 conceptually illustrates a process 1700 for implementing mutual excluding grouping of coding modes or tools. In some embodiments, one or more processing units (e.g., a processor) of a computing device implementing the decoder 1500 performs the process 1700 by executing instructions stored in a computer readable medium. In some embodiments, an electronic apparatus implementing the decoder 1500 performs the process 1700.

The decoder receives (at block 1710) data for a block of pixels to be decoded as a current block of a current picture of a video.

The decoder identifies (at block 1730) a highest priority coding mode from among one or more coding modes. In some embodiments, each coding mode of the particular set of coding modes is assigned a priority according to a priority rule that is defined based on a parameter of the current block.

The decoder disables (at block 1740) all other coding modes in the particular set of coding modes if the highest priority coding mode is enabled. The conditions for enabling the various coding modes are described above in Sections related to those coding modes. The condition for enabling a coding mode may include receiving an express syntax element from the bitstream for the coding mode. The condition for enabling a coding mode may also include having a particular characteristic or parameter (e.g., size, aspect ratio) for the current block being coded. For example, when the particular set of coding modes includes a first coding mode assigned a higher priority and a second coding mode assigned a lower priority, and when the first coding mode is enabled, the decoder disables (at block 1745) the second coding mode for the current block. In some embodiments, when the first coding mode is enabled, the decoder disables all coding modes in the particular set of coding modes except the first coding mode. In some embodiments, the decoder enables GBI (which means using unequal weights to blend the inter predictions from list-0 and list-1) if the GBi weight index indicates unequal weights, but disables BDOF because GBI is assigned higher priority than BDOF. For another example, in some embodiments, the decoder enables GBI (which means using unequal weights to blend the inter predictions from list-0 and list-1) if the GBi weight index indicates unequal weights, but disables DMVR, because GBI is assigned higher priority than DMVR. For another example, in some embodiments, the encoder enables CIIP if CIIP flag is equal to 1, but disables GBi, BDOF, and/or DMVR, because CIIP is assigned higher priority than the disabled tools.

The decoder decodes (at block 1750) the current block by using an inter-prediction that is computed according to the enabled coding mode.

XVII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 18:
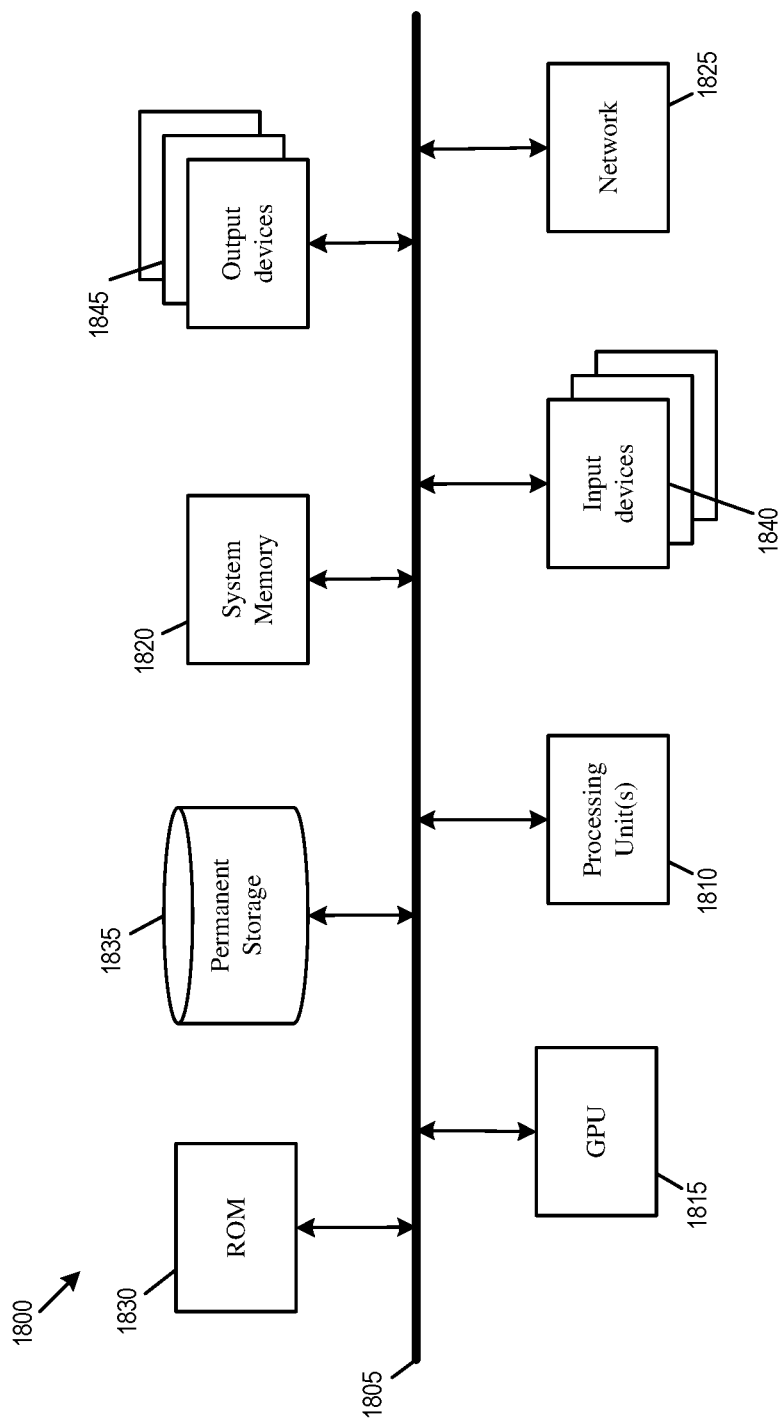
FIG. 18 conceptually illustrates an electronic system with which some embodiments of the present disclosure are implemented.

FIG. 18 conceptually illustrates an electronic system 1800 with which some embodiments of the present disclosure are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics-processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the GPU 1815, the read-only memory 1830, the system memory 1820, and the permanent storage device 1835.

From these various memory units, the processing unit(s) 1810 retrieves instructions to execute and data to process in order to execute the processes of the present disclosure. The processing unit(s) may be a single processor or a multi-core processor in different embodiments. Some instructions are passed to and executed by the GPU 1815. The GPU 1815 can offload various computations or complement the image processing provided by the processing unit(s) 1810.

The read-only-memory (ROM) 1830 stores static data and instructions that are used by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the present disclosure use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor uses at runtime. In some embodiments, processes in accordance with the present disclosure are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 14 and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
receiving data for a block of pixels to be decoded as a current block of a current picture of a video;
when a first coding mode for the current block is enabled, disabling a second coding mode for the current block, wherein the first and second coding modes specify different methods for computing an inter-prediction for the current block; and
decoding the current block by using an inter-prediction that is computed according to an enabled coding mode,
wherein a particular set of two or more coding modes comprises the first and second coding modes,
wherein, when the first coding mode is enabled, all coding modes in the particular set of coding modes except the first coding mode are disabled,
wherein the particular set of coding modes comprises generalized bi-prediction (GBI), decoder-side motion vector refinement (DMVR), bi-directional optical flow (BDOF), and combined inter and intra prediction (CIIP), and
wherein:
GBI is a coding mode in which the video decoder performs weighted averaging of two prediction signals in two different directions to generate the inter-prediction,
DMVR is a coding mode in which the video decoder searches for a refined motion vector around an initial motion vector and uses the refined motion vector to generate the inter-prediction,
BDOF is a coding mode in which the video decoder calculates a motion refinement to minimize distortion between prediction samples of different directions and adjusts the inter-prediction based on the calculated refinement, and
CIIP is a coding mode in which the video decoder combines an inter-prediction signal with an intra-prediction signal to generate the inter-prediction.

2. The method of claim 1, wherein the first coding mode is combined inter and intra prediction (CIIP) and the second coding mode is generalized bi-prediction (GBI).

3. The method of claim 1, wherein the first coding mode is generalized bi-prediction (GBI) and the second coding mode is bi-directional optical flow (BDOF).

4. The method of claim 1, wherein the first coding mode is generalized bi-prediction (GBI) and the second coding mode is decoder-side motion vector refinement (DMVR).

5. The method of claim 1, wherein the first coding mode is combined inter and intra prediction (CIIP) and the second coding mode is bi-directional optical flow (BDOF).

6. The method of claim 1, wherein the first coding mode is combined inter and intra prediction (CIIP) and the second coding mode is decoder-side motion vector refinement (DMVR).

7. An electronic apparatus comprising:
a video decoder circuit configured to perform operations comprising:
  receiving data for a block of pixels to be decoded as a current block of a current picture of a video;
  when a first coding mode for the current block is enabled, disabling a second coding mode for the current block, wherein the first and second coding modes specify different methods for computing an inter-prediction for the current block; and
  decoding the current block by using an inter-prediction that is computed according to an enabled coding mode,
wherein a particular set of two or more coding modes comprises the first and second coding modes,
wherein, when the first coding mode is enabled, all coding modes in the particular set of coding modes except the first coding mode are disabled,
wherein the particular set of coding modes comprises generalized bi-prediction (GBI), decoder-side motion vector refinement (DMVR), bi-directional optical flow (BDOF), and combined inter and intra prediction (CIIP), and
wherein:
  GBI is a coding mode in which the video decoder performs weighted averaging of two prediction signals in two different directions to generate the inter-prediction,
  DMVR is a coding mode in which the video decoder searches for a refined motion vector around an initial motion vector and uses the refined motion vector to generate the inter-prediction,
  BDOF is a coding mode in which the video decoder calculates a motion refinement to minimize distortion between prediction samples of different directions and adjusts the inter-prediction based on the calculated refinement, and
  CIIP is a coding mode in which the video decoder combines an inter-prediction signal with an intra-prediction signal to generate the inter-prediction.

\* \* \* \* \*